United States Patent
Yang et al.

(10) Patent No.: US 12,413,339 B2
(45) Date of Patent: Sep. 9, 2025

(54) MODULATION OF EXTENDED LONG RANGE WIRELESS PACKETS

(71) Applicant: QUALCOMM Incorporated, San Diego, CA (US)

(72) Inventors: Lin Yang, San Diego, CA (US); Tzu-Hsuan Chou, San Diego, CA (US); Bin Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 10 days.

(21) Appl. No.: 18/502,880

(22) Filed: Nov. 6, 2023

(65) Prior Publication Data
US 2025/0150205 A1 May 8, 2025

(51) Int. Cl.
*H04L 1/00* (2006.01)
*H04L 27/26* (2006.01)

(52) U.S. Cl.
CPC .......... *H04L 1/0061* (2013.01); *H04L 1/0059* (2013.01); *H04L 27/2666* (2013.01)

(58) Field of Classification Search
CPC ... H04L 1/0026; H04L 1/0059; H04L 1/0061; H04L 1/1893; H04L 27/2602; H04L 27/2666
See application file for complete search history.

(56) References Cited

U.S. PATENT DOCUMENTS 10,575,242 B2  2/2020  Kneckt et al.
11,457,068 B2*  9/2022  Noh .................. H04L 69/18
2021/0367886 A1  11/2021  Chen et al.
2022/0174135 A1*  6/2022  Kim .................. H04L 69/16
2024/0022365 A1*  1/2024  Chen ................ H04L 27/2602

FOREIGN PATENT DOCUMENTS

WO  WO-2024210977  10/2024

OTHER PUBLICATIONS

International Search Report and Written Opinion—PCT/US2024/051839—ISA/EPO—Apr. 2, 2025.
Partial International Search Report—PCT/US2024/051839—ISA/EPO—Feb. 12, 2025.

* cited by examiner

*Primary Examiner* — Shelly A Chase
(74) *Attorney, Agent, or Firm* — William P. Gvoth; Holland & Hart LLP

(57) ABSTRACT

This disclosure provides methods, components, devices and systems for modulation of extended long range (ELR) wireless packets. A wireless communication device receives an indication to transmit a single-user wireless packet associated with an ELR communication mode. The indication may be of a resource allocation, associated with the ELR communication mode, via which to transmit the packet. The packet may include a preamble portion and a data portion, with at least the data portion associated with a duplication scheme pertaining to the ELR communication mode. The wireless communication device transmits the packet in accordance with the indication. The wireless communication device may transmit the packet using a first quantity of duplications of at least the data portion in accordance with the duplication scheme, with the first quantity of duplications associated with the ELR communication mode.

30 Claims, 23 Drawing Sheets

7 DC

13 Tones

106 Tones

MODULATION OF EXTENDED LONG RANGE WIRELESS PACKETS

TECHNICAL FIELD

This disclosure relates to wireless communication and, more specifically, to modulation of extended long range (ELR) wireless packets.

DESCRIPTION OF THE RELATED TECHNOLOGY

A wireless local area network (WLAN) may be formed by one or more wireless access points (APs) that provide a shared wireless communication medium for use by multiple client devices also referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

In some WLANs, one or more wireless devices, such as wireless STAs and/or wireless APs, may extend a distance, or coverage range, over which wireless coverage is provided. For example, the wireless devices may operate using a 2.4 gigahertz (GHz) frequency band rather than a 5 GHz or 6 GHz frequency band, because the 2.4 GHz band uses longer waves, which improves coverage range and provides improved transmission through objects. Such wireless communication systems may be referred to as long range (LR) wireless communication systems.

SUMMARY

The systems, methods, and devices of this disclosure each have several innovative aspects, no single one of which is solely responsible for the desirable attributes disclosed herein.

One innovative aspect of the subject matter described in the disclosure can be implemented in a method for wireless communication performable by a wireless communication device. The method may include receiving an indication to transmit a single-user wireless packet associated with an extended long range (ELR) communication mode, where the single-user wireless packet includes a preamble portion and a data portion, and where at least the data portion is associated with a duplication scheme pertaining to the ELR communication mode and transmitting, in accordance with the indication, the single-user wireless packet using a first quantity of duplications of at least the data portion in accordance with the duplication scheme, where the first quantity of duplications is associated with the ELR communication mode.

Another innovative aspect of the subject matter described in this disclosure can be implemented in a wireless communication device. The wireless communication device may include a processing system that includes processor circuitry and memory circuitry that stores code. The processing system may be configured to cause the wireless communication device to receive an indication to transmit a single-user wireless packet associated with an ELR communication mode, where the single-user wireless packet includes a preamble portion and a data portion, and where at least the data portion is associated with a duplication scheme pertaining to the ELR communication mode and transmit, in accordance with the indication, the single-user wireless packet using a first quantity of duplications of at least the data portion in accordance with the duplication scheme, where the first quantity of duplications is associated with the ELR communication mode.

Another innovative aspect of the subject matter described in this disclosure can be implemented in a wireless communication device. The wireless communication device may include means for receiving an indication to transmit a single-user wireless packet associated with an ELR communication mode, where the single-user wireless packet includes a preamble portion and a data portion, and where at least the data portion is associated with a duplication scheme pertaining to the ELR communication mode and means for transmitting, in accordance with the indication, the single-user wireless packet using a first quantity of duplications of at least the data portion in accordance with the duplication scheme, where the first quantity of duplications is associated with the ELR communication mode.

Another innovative aspect of the subject matter described in this disclosure can be implemented in a non-transitory computer-readable medium storing code for wireless communications by a wireless communication device. The code may include instructions executable by one or more processors, individually or collectively, to receive an indication to transmit a single-user wireless packet associated with an ELR communication mode, where the single-user wireless packet includes a preamble portion and a data portion, and where at least the data portion is associated with a duplication scheme pertaining to the ELR communication mode and transmit, in accordance with the indication, the single-user wireless packet using a first quantity of duplications of at least the data portion in accordance with the duplication scheme, where the first quantity of duplications is associated with the ELR communication mode.

In some examples of the method, wireless communication devices, and non-transitory computer-readable medium described herein may further include operations, features, means, or instructions for producing the first quantity of duplications of at least the data portion according to a blockwise repetition procedure and applying a binary convolutional coding (BCC) interleaver, a low-density parity check (LDPC) tone mapper, or both to the data portion.

In some examples of the method, wireless communication devices, and non-transitory computer-readable medium described herein may further include operations, features, means, or instructions for applying a scrambling sequence to the first quantity of duplications of at least the data portion prior to applying the BCC interleaver, the LDPC tone mapper, or both to the data portion.

In some examples of the method, wireless communication devices, and non-transitory computer-readable medium described herein may further include operations, features, means, or instructions for encoding the data portion according to a repetition coding scheme, where the repetition coding scheme may be associated with an inner coding of the data portion, encoding LDPC coded bits according to a low-density parity check (LDPC) coding scheme, where the LDPC coding scheme may be associated with an outer coding of the data portion, and producing the first quantity of duplications of at least the data portion in accordance with concatenating the LDPC coding scheme with the repetition coding scheme and repeating LDPC encoded bits by the first quantity.

In some examples of the method, wireless communication devices, and non-transitory computer-readable medium described herein may further include operations, features, means, or instructions for duplicating a set of multiple symbols of the data portion in a time domain to produce the first quantity of duplications, the single-user wireless packet including a quantity of guard intervals in the time domain corresponding to the first quantity of duplications.

Some examples of the method, wireless communication devices, and non-transitory computer-readable medium described herein may further include operations, features, means, or instructions for populating a subset of tones in a frequency domain in accordance with the first quantity of duplications and producing the first quantity of duplications in accordance with transforming a frequency domain signal associated with the subset of tones to a time domain signal associated with a set of multiple symbols, where the set of multiple symbols may be associated with the first quantity of duplications, and where the single-user wireless packet includes a guard interval prior to the set of multiple symbols.

Another innovative aspect of the subject matter described in the disclosure can be implemented in a method for wireless communication performable by a wireless communication device. The method may include receiving an indication of a resource allocation via which to transmit a single-user wireless packet associated with an ELR communication mode, where the resource allocation is associated with a distributed resource unit (dRU) including 52 tones and a first frequency range and transmitting the single-user wireless packet in accordance with the resource allocation, where the resource allocation is associated with the ELR communication mode.

Another innovative aspect of the subject matter described in the disclosure can be implemented in a method for wireless communication performable by a wireless communication device. The wireless communication device may include a processing system that includes processor circuitry and memory circuitry that stores code. The processing system may be configured to cause the wireless communication device to receive an indication of a resource allocation via which to transmit a single-user wireless packet associated with an ELR communication mode, where the resource allocation is associated with a dRU including 52 tones and a first frequency range and transmit the single-user wireless packet in accordance with the resource allocation, where the resource allocation is associated with the ELR communication mode.

Another innovative aspect of the subject matter described in the disclosure can be implemented in a method for wireless communication performable by a wireless communication device. The wireless communication device may include means for receiving an indication of a resource allocation via which to transmit a single-user wireless packet associated with an ELR communication mode, where the resource allocation is associated with a dRU including 52 tones and a first frequency range and means for transmitting the single-user wireless packet in accordance with the resource allocation, where the resource allocation is associated with the ELR communication mode.

Another innovative aspect of the subject matter described in the disclosure can be implemented in a non-transitory computer-readable medium storing code for wireless communications. The code may include instructions executable by one or more processors, individually or collectively, to receive an indication of a resource allocation via which to transmit a single-user wireless packet associated with an ELR communication mode, where the resource allocation is associated with a dRU including 52 tones and a first frequency range and transmit the single-user wireless packet in accordance with the resource allocation, where the resource allocation is associated with the ELR communication mode.

Some examples of the method, wireless communication devices, and non-transitory computer-readable medium described herein may further include operations, features, means, or instructions for applying a power backoff in accordance with the resource allocation, where the resource allocation being associated with the dRU including 52 tones and the ELR communication mode triggers an application of the power backoff and transmitting the single-user wireless packet in accordance with the power backoff.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
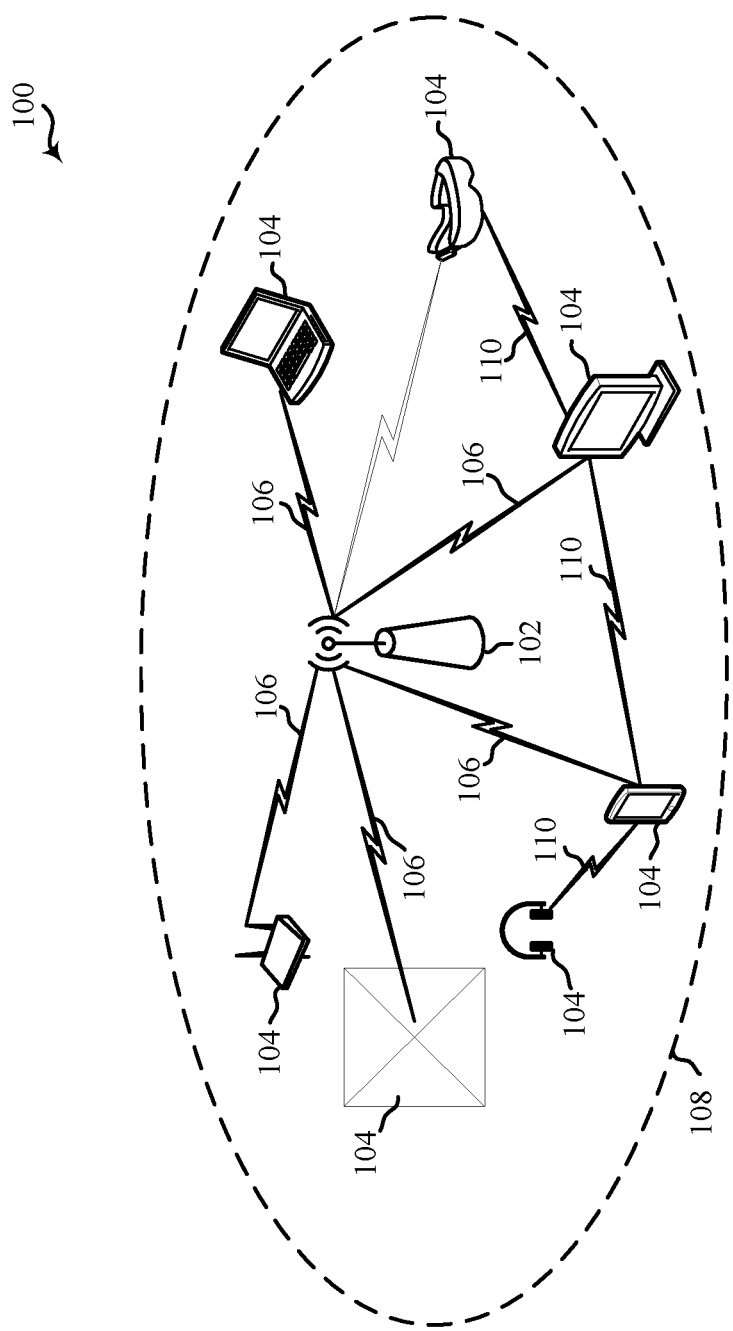
FIG. 1 shows a pictorial diagram of an example wireless communication network.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described examples can be implemented in any device, system or network that is capable of transmitting and receiving RF signals according to one or more of the following technologies or techniques: code division multiple access (CDMA), time division multiple access (TDMA), orthogonal frequency division multiplexing (OFDM), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO (MU-MIMO). The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IOT) network.

Various aspects relate generally to wireless communications. Some aspects more specifically relate to extended long range (ELR) wireless packet design. In some implementations, one or more wireless devices, such as wireless stations (STAs), wireless access points (APs), or both in a WLAN communication system, may extend a distance, or coverage range, over which wireless communication is provided. For example, the wireless devices may operate using a 2.4 gigahertz (GHz) frequency band rather than a 5 GHz or 6 GHz frequency band, because the 2.4 GHz band uses longer waves, which improves range and provides improved transmission through objects. Such wireless communication systems may be referred to as long range (LR) wireless communication systems. The LR wireless communication systems may be outdoor IOT networks and indoor networks with longer range conditions. The wireless communication devices may be wireless video doorbells, outdoor surveillance cameras, wireless garage door controllers, outdoor sprinkler controllers, wireless speakers, smart appliances, security IoT devices, or any combination thereof. However, one or more wireless devices may still be out of the range provided by 2.4 GHz communication. Further, the data rate of the communications in the LR wireless communication system may be relatively low due to slower transmission time using longer waves, which may cause latency and relatively low throughput when compared with a system that uses a relatively higher frequency band and relatively shorter waves.

As described herein, one or more wireless communication devices may improve the data rate, the range, or both for LR wireless communication systems, which may correspondingly be referred to as ELR (or enhanced long range) systems. The wireless communication devices may implement an ELR wireless packet design to obtain a target data rate while maintaining an existing coverage range of an LR wireless communication system, where the coverage range may be understood as the geographical area across which the wireless communication devices may transmit and receive signaling. Additionally, or alternatively, the wireless communication device may implement an ELR wireless packet design to extend a coverage range while maintaining a similar, or slightly lower, data rate when compared with an existing coverage range for the LR wireless communication system.

In some examples, the described ELR wireless packet design may improve an uplink power by approximately 6 to 7 decibels (dB). Such greater uplink power may be useful to overcome a power imbalance between uplink and downlink, such as an approximately 10 dB power imbalance between uplink and downlink (if an AP has double a quantity of antennas than a client device, such as a STA). Further, the described techniques may leverage existing uplink OFDMA to improve efficiency and/or provide support for non-AP STA traffic, which may increase network compatibility. The ELR wireless packet design may be associated with no changes to downlink communication such that existing beacon and management frames may be reused. The ELR wireless packet design also may support use cases of wireless video doorbells and/or security cameras (generally, smart home devices), and may support an approximately 9 to 10 dB longer range at 6 Mbps than some other systems. For example, the described techniques may support smart home IoT markets, including smart home IoT devices, and may support a range of approximately 1 kilometer (km).

A wireless communication device, such as a wireless STA, may transmit an ELR wireless packet to another wireless communication device, such as an AP, with duplications for at least a data portion. The ELR wireless packet may be a single-user wireless packet having a single-user protocol data unit (PPDU) format. In some implementations, the wireless communication device may transmit an ELR wireless packet after receipt of an indication to transmit the ELR wireless packet. The wireless communication device may transmit the packet in accordance with the indication, where the packet may have the duplications to at least the data portion (such as an ELR-data portion). In some implementations, the wireless communication device may produce the duplications according to a duplication scheme, which may include a coded-bit duplication scheme, a time domain duplication scheme, a frequency domain duplication scheme, or any combination thereof. For example, the wireless communication device may, in the coded-bit duplication scheme, produce the duplications according to a blockwise repetition procedure, or by concatenating portions of encoded bits. In the time domain duplication scheme, the wireless communication device may duplicate symbols in a time domain, or populate tones in a frequency domain such that the duplication is produced after transformation to the time domain. In the frequency domain duplication scheme, the wireless communication device may modulate the data portion according to a modulation and coding scheme (MCS) and a resource allocation, where the resource allocation accommodates for (and is likewise associated with) the duplications.

In some implementations, the wireless communication device may further duplicate a signal (SIG) field of the ELR wireless packet. For example, the packet may include duplications of a SIG field associated with the ELR communication, such as an ELR-SIG field or an ultra-high reliability (UHR)-ELR-SIG field. In some aspects, the wireless communication device may apply a same duplication scheme to both the data portion and the ELR-SIG field of the packet. In some other aspects, the wireless communication device may apply different duplication schemes to the data portion and the ELR-SIG field. Additionally, or alternatively, the wireless communication device may transmit an ELR wireless packet via a resource allocation associated with a distributed resource unit (dRU). For example, the wireless communication device may transmit the ELR wireless packet over distributed resources (such as including a dRU including 52 tones).

Particular aspects of the subject matter described in this disclosure can be implemented to realize one or more of the following potential advantages, in addition to other advantages described herein. In some implementations, a wireless communication device may increase signaling throughput and efficiency for an LR wireless communication system while maintaining a coverage range of the LR wireless communication system by updating an ELR wireless packet design, where the ELR wireless packet includes duplications to at least the data portion (and potentially also to the ELR-SIG field) and/or is transmitted via a dRU. Specifically, the wireless communication device may apply the duplication scheme, transmit the ELR wireless packet via the dRU, or any combination thereof to increase signaling throughput or improve signaling accuracy, thereby improving signaling efficiency for the LR wireless communication system by reducing decoding errors and unnecessary retransmissions. Additionally, or alternatively, the wireless communication device may increase a coverage range of the LR wireless communication system by updating an ELR wireless packet design. Specifically, the wireless communication device may transmit the ELR wireless packet using a narrow bandwidth, which may have a longer wavelength, thereby extending the coverage range of the LR wireless communication system. Further, the wireless communication device may improve reliability of the transmission by repeating the ELR wireless packet transmission in the frequency domain, which may provide for improved decoding accuracy and fewer retransmissions.

FIG. 1 shows a pictorial diagram of an example wireless communication network 100. According to some aspects, the wireless communication network 100 can be an example of a wireless local area network (WLAN) such as a Wi-Fi network. For example, the wireless communication network 100 can be a network implementing at least one of the IEEE 802.11 family of wireless communication protocol standards (such as defined by the IEEE 802.11-2020 specification or amendments thereof including, but not limited to, 802.11ay, 802.11ax, 802.11az, 802.11ba, 802.11bd, 802.11be, 802.11bf, and 802.11bn). In some other examples, the wireless communication network 100 can be an example of a cellular radio access network (RAN), such as a 5G or 6G RAN that implements one or more cellular protocols such as those specified in one or more 3GPP standards. In some other examples, the wireless communication network 100 can include a WLAN that functions in an interoperable or converged manner with one or more cellular RANs to provide greater or enhanced network coverage to wireless communication devices within the wireless communication network 100 or to enable such devices to connect to a cellular network's core, such as to access the network management capabilities and functionality offered by the cellular network core.

The wireless communication network 100 may include numerous wireless communication devices including at least one wireless access point (AP) 102 and any number of wireless stations (STAs) 104. While only one AP 102 is shown in FIG. 1, the wireless communication network 100 can include multiple APs 102. The AP 102 can be or represent various different types of network entities including, but not limited to, a home networking AP, an enterprise-level AP, a single-frequency AP, a dual-band simultaneous (DBS) AP, a tri-band simultaneous (TBS) AP, a standalone AP, a non-standalone AP, a software-enabled AP (soft AP), and a multi-link AP (also referred to as an AP multi-link device (MLD)), as well as cellular (such as 3GPP, 4G LTE, 5G or 6G) base stations or other cellular network nodes such as a Node B, an evolved Node B (eNB), a gNB, a transmission reception point (TRP) or another type of device or equipment included in a radio access network (RAN), including Open-RAN (O-RAN) network entities, such as a central unit (CU), a distributed unit (DU) or a radio unit (RU).

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, other handheld or wearable communication devices, netbooks, notebook computers, tablet computers, laptops, Chromebooks, augmented reality (AR), virtual reality (VR), mixed reality (MR) or extended reality (XR) wireless headsets or other peripheral devices, wireless earbuds, other wearable devices, display devices (such as TVs, computer monitors or video gaming consoles), video game controllers, navigation systems, music or other audio or stereo devices, remote control devices, printers, kitchen appliances (including smart refrigerators) or other household appliances, key fobs (such as for passive keyless entry and start (PKES) systems), Internet of Things (IoT) devices, and vehicles, among other examples.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the wireless communication network 100. The BSS may be identified by STAs 104 and other devices by a service set identifier (SSID), as well as a basic service set identifier (BSSID), which may be a medium access control (MAC) address of the AP 102. The AP 102 may periodically broadcast beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification or indication of a primary channel used by the respective AP 102 as well as a timing synchronization function (TSF) for establishing or maintaining timing synchronization with the AP 102. The AP 102 may provide access to external networks to various STAs 104 in the wireless communication network 100 via respective communication links 106.

To establish a communication link 106 with an AP 102, each of the STAs 104 is configured to perform passive or active scanning operations ("scans") on frequency channels in one or more frequency bands (such as the 2.4 GHz, 5 GHz, 6 GHz, 45 GHz, or 60 GHz bands). To perform passive scanning, a STA 104 listens for beacons, which are transmitted by respective APs 102 at periodic time intervals referred to as target beacon transmission times (TBTTs). To perform active scanning, a STA 104 generates and sequentially transmits probe requests on each channel to be scanned and listens for probe responses from APs 102. Each STA 104 may identify, determine, ascertain, or select an AP 102 with which to associate in accordance with the scanning information obtained through the passive or active scans, and to perform authentication and association operations to establish a communication link 106 with the selected AP 102. The selected AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA 104 or to select among multiple APs 102 that together form an extended service set (ESS) including multiple connected BSSs. For example, the wireless communication network 100 may be connected to a wired or wireless distribution system that may enable multiple APs 102 to be connected in such an ESS. As such, a STA 104 can be covered by more than one AP 102 and can associate with different APs 102 at different times for different transmissions. Additionally, after association with an AP 102, a STA 104 also may periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some examples, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some examples, ad hoc networks may be implemented within a larger network such as the wireless communication network 100. In such examples, while the STAs 104 may be capable of communicating with each other through the AP 102 using communication links 106, STAs 104 also can communicate directly with each other via direct wireless communication links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless communication links 110 include Wi-Fi Direct connections, connections established by using a Wi-Fi Tunneled Direct Link Setup (TDLS) link, and other P2P group connections.

In some networks, the AP 102 or the STAs 104, or both, may support applications associated with high throughput or low-latency requirements, or may provide lossless audio to one or more other devices. For example, the AP 102 or the STAs 104 may support applications and use cases associated with ultra-low-latency (ULL), such as ULL gaming, or streaming lossless audio and video to one or more personal audio devices (such as peripheral devices) or AR/VR/MR/XR headset devices. In scenarios in which a user uses two or more peripheral devices, the AP 102 or the STAs 104 may support an extended personal audio network enabling communication with the two or more peripheral devices. Additionally, the AP 102 and STAs 104 may support additional ULL applications such as cloud-based applications (such as VR cloud gaming) that have ULL and high throughput requirements.

As indicated above, in some implementations, the AP 102 and the STAs 104 may function and communicate (via the respective communication links 106) according to one or more of the IEEE 802.11 family of wireless communication protocol standards. These standards define the WLAN radio and baseband protocols for the physical (PHY) and MAC layers. The AP 102 and STAs 104 transmit and receive wireless communications (hereinafter also referred to as "Wi-Fi communications" or "wireless packets") to and from one another in the form of PHY protocol data units (PPDUs).

Each PPDU is a composite structure that includes a PHY preamble and a payload that is in the form of a PHY service data unit (PSDU). The information provided in the preamble may be used by a receiving device to decode the subsequent data in the PSDU. In instances in which a PPDU is transmitted over a bonded or wideband channel, the preamble fields may be duplicated and transmitted in each of multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is associated with the particular IEEE 802.11 wireless communication protocol to be used to transmit the payload.

The APs 102 and STAs 104 in the wireless communication network 100 may transmit PPDUs over an unlicensed spectrum, which may be a portion of spectrum that includes frequency bands traditionally used by Wi-Fi technology, such as the 2.4 GHz, 5 GHz, 6 GHz, 45 GHz, and 60 GHz bands. Some examples of the APs 102 and STAs 104 described herein also may communicate in other frequency bands that may support licensed or unlicensed communications. For example, the APs 102 or STAs 104, or both, also may be capable of communicating over licensed operating bands, where multiple operators may have respective licenses to operate in the same or overlapping frequency ranges. Such licensed operating bands may map to or be associated with frequency range designations of FR1 (410 MHz-7.125 GHz), FR2 (24.25 GHz-52.6 GHz), FR3 (7.125 GHz-24.25 GHz), FR4a or FR4-1 (52.6 GHz-71 GHz), FR4 (52.6 GHz-114.25 GHz), and FR5 (114.25 GHz-300 GHz).

Each of the frequency bands may include multiple sub-bands and frequency channels (also referred to as subchannels). For example, PPDUs conforming to the IEEE 802.11n, 802.11ac, 802.11ax, 802.11be and 802.11bn standard amendments may be transmitted over one or more of the 2.4 GHz, 5 GHz, or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 MHz, 240 MHz, 320 MHz, 480 MHz, or 640 MHz by bonding together multiple 20 MHz channels.

Figure 2:
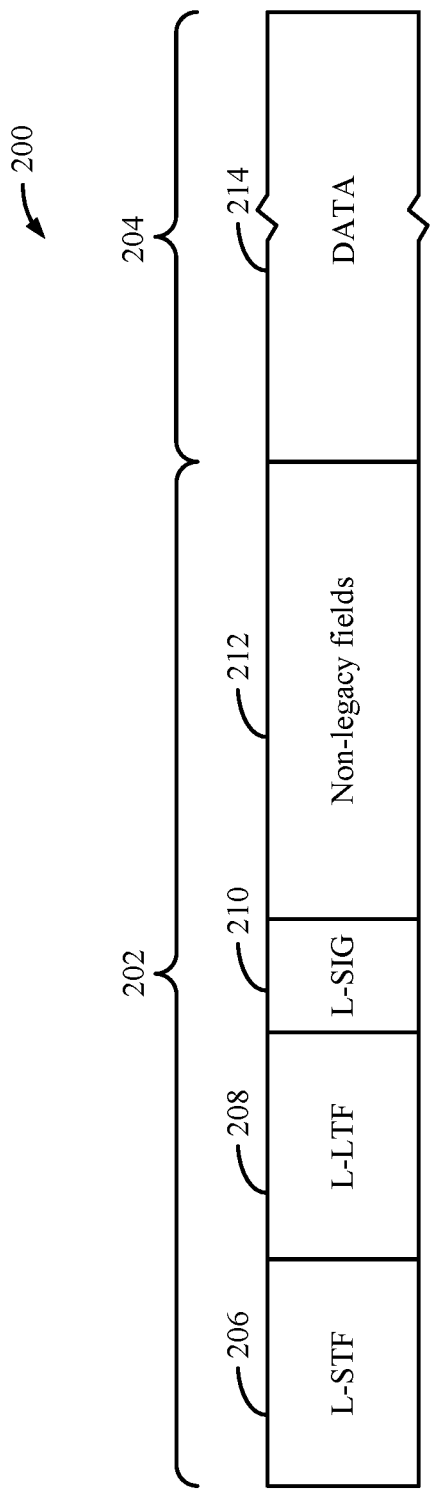
FIG. 2 shows an example protocol data unit (PDU) usable for communications between a wireless access point (AP) and one or more wireless stations (STAs).

FIG. 2 shows an example protocol data unit (PDU) 200 usable for wireless communication between a wireless AP and one or more wireless STAs. For example, the AP and STAs may be examples of the AP 102 and the STAs 104 described with reference to FIG. 1. The PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two symbols, a legacy long training field (L-LTF) 208, which may consist of two symbols, and a legacy signal field (L-SIG) 210, which may consist of two symbols. The legacy portion of the preamble 202 may be configured according to the IEEE 802.1 Ta wireless communication protocol standard. The preamble 202 also may include a non-legacy portion including one or more non-legacy fields 212, for example, conforming to one or more of the IEEE 802.11 family of wireless communication protocol standards.

The L-STF 206 generally enables a receiving device (such as an AP 102 or a STA 104) to perform coarse timing and frequency tracking and automatic gain control (AGC). The L-LTF 208 generally enables the receiving device to perform fine timing and frequency tracking and also to perform an initial estimate of the wireless channel. The L-SIG 210 generally enables the receiving device to determine (such as obtain, select, identify, detect, ascertain, calculate, or compute) a duration of the PDU and to use the determined duration to avoid transmitting on top of the PDU. The legacy portion of the preamble, including the L-STF 206, the L-LTF 208 and the L-SIG 210, may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of MAC protocol data units (MPDUs) or an aggregated MPDU (A-MPDU).

Figure 3:
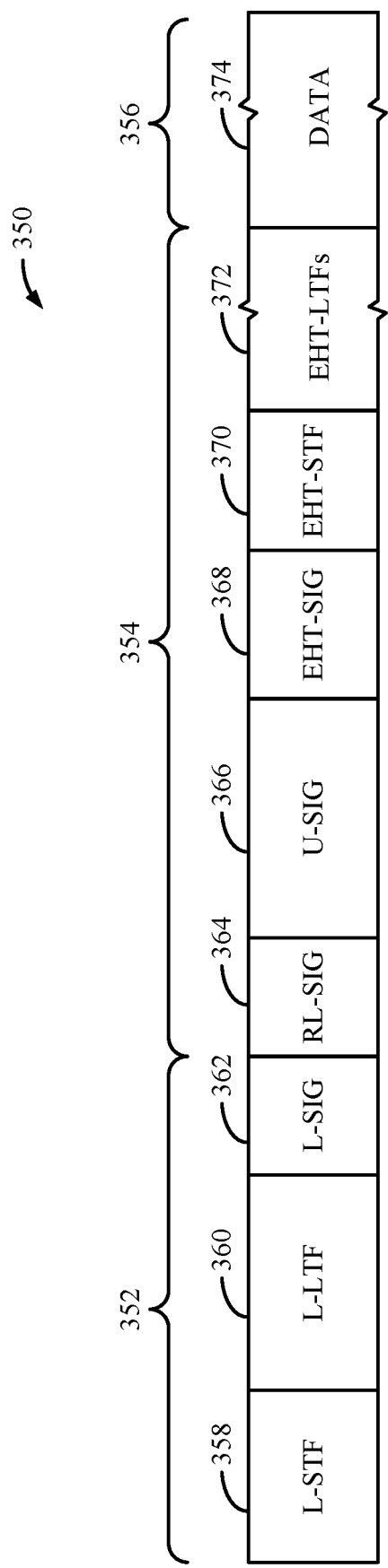
FIG. 3 shows an example physical layer (PHY) protocol data unit (PPDU) usable for communications between a wireless AP and one or more wireless STAs.

FIG. 3 shows an example physical layer (PHY) protocol data unit (PPDU) 350 usable for communications between a wireless AP and one or more wireless STAs. For example, the AP and STAs may be examples of the AP 102 and the STAs 104 described with reference to FIG. 1. As shown, the PPDU 350 includes a PHY preamble, that includes a legacy portion 352 and a non-legacy portion 354, and a payload 356 that includes a data field 374. The legacy portion 352 of the preamble includes an L-STF 358, an L-LTF 360, and an L-SIG 362. The non-legacy portion 354 of the preamble includes a repetition of L-SIG (RL-SIG) 364 and multiple wireless communication protocol version-dependent signal fields after RL-SIG 364. For example, the non-legacy portion 354 may include a universal-signal field 366 (referred to herein as "U-SIG 366") and an EHT signal field 368 (referred to herein as "EHT-SIG 368"). The presence of RL-SIG 364 and U-SIG 366 may indicate to EHT- or later version-compliant STAs 104 that the PPDU 350 is an EHT PPDU or a PPDU conforming to any later (post-EHT) version of a new wireless communication protocol conforming to a future IEEE 802.11 wireless communication protocol standard. One or both of U-SIG 366 and EHT-SIG 368 may be structured as, and carry version-dependent information for, other wireless communication protocol versions associated with amendments to the IEEE family of standards beyond EHT. For example, U-SIG 366 may be used by a receiving device (such as the AP 102 or the STA 104) to interpret bits in one or more of EHT-SIG 368 or the data field 374. Like L-STF 358, L-LTF 360, and L-SIG 362, the information in U-SIG 366 and EHT-SIG 368 may be duplicated and transmitted in each of the component 20 MHz channels in instances involving the use of a bonded channel.

The non-legacy portion 354 further includes an additional short training field 370 (referred to herein as "EHT-STF 370," although it may be structured as, and carry version-dependent information for, other wireless communication protocol versions beyond EHT) and one or more additional long training fields 372 (referred to herein as "EHT-LTFs 372," although they may be structured as, and carry version-dependent information for, other wireless communication protocol versions beyond EHT). EHT-STF 370 may be used for timing and frequency tracking and AGC, and EHT-LTF 372 may be used for more refined channel estimation.

EHT-SIG 368 may be used by an AP 102 to identify and inform one or multiple STAs 104 that the AP 102 has scheduled uplink (UL) or downlink (DL) resources for them. EHT-SIG 368 may be decoded by each compatible STA 104 served by the AP 102. EHT-SIG 368 may generally be used by the receiving device to interpret bits in the data field 374. For example, EHT-SIG 368 may include resource unit (RU) allocation information, spatial stream configuration information, and per-user (such as STA-specific) signaling information. Each EHT-SIG 368 may include a common field and at least one user-specific field. In the context of OFDMA, the common field can indicate RU distributions to multiple STAs 104, indicate the RU assignments in the frequency domain, indicate which RUs are allocated for MU-MIMO transmissions and which RUs correspond to OFDMA transmissions, and the number of users in allocations, among other examples. The user-specific fields are assigned to particular STAs 104 and carry STA-specific scheduling information such as user-specific MCS values and user-specific RU allocation information. Such information enables the respective STAs 104 to identify and decode corresponding RUs in the associated data field 374.

Figure 4:
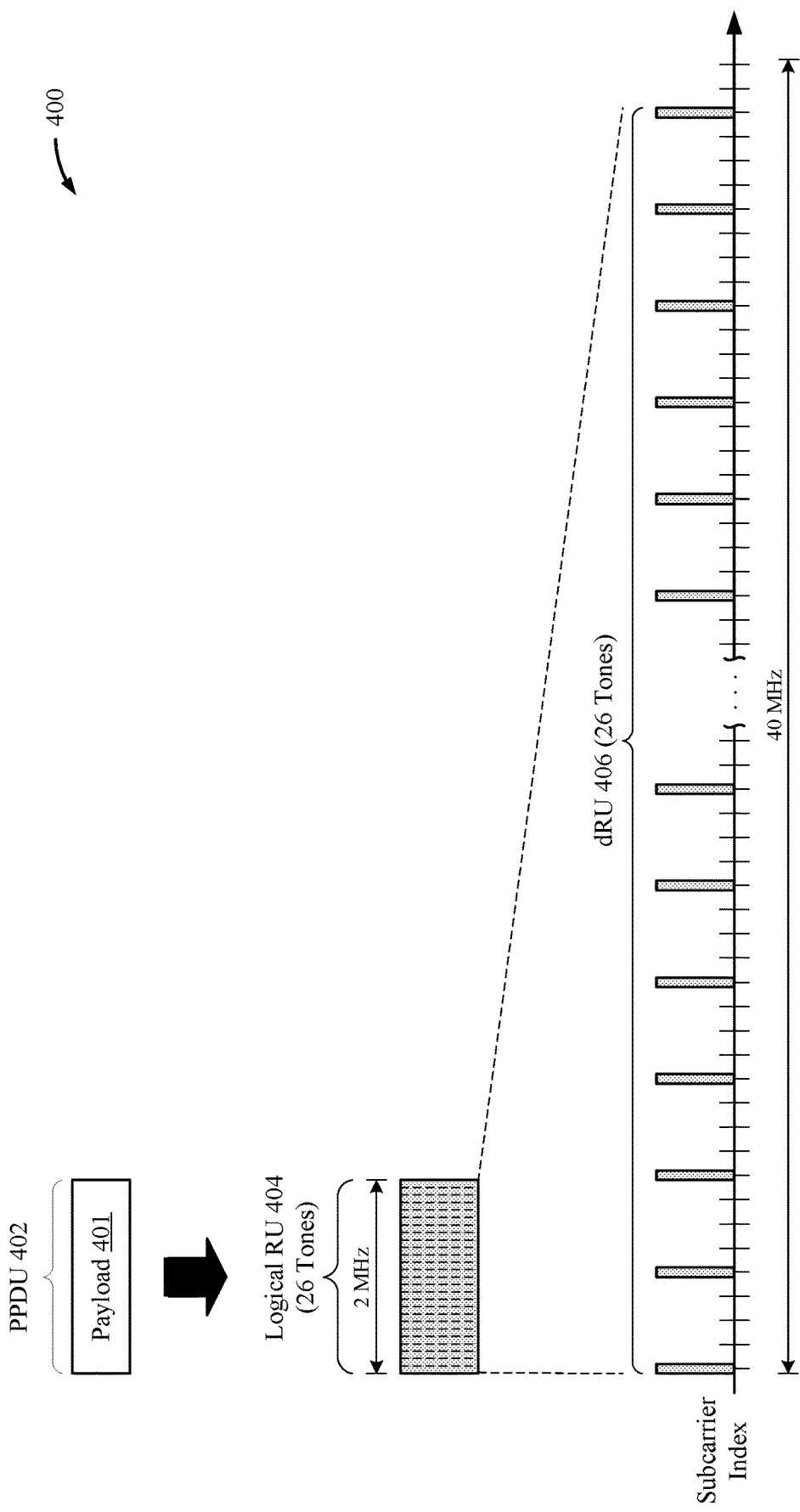
FIG. 4 shows a frequency diagram depicting an example distributed tone mapping.

FIG. 4 shows a frequency diagram 400 depicting an example distributed tone mapping. More specifically, FIG. 4 shows an example mapping of how the tones of a payload 401 of a PPDU 402 are distributed for transmission over a spreading bandwidth of a wireless channel. In the illustrated example, the tones in a logical RU 404 (which may represent an rRU of non-distributed tones in accordance with a legacy tone plan) associated with payload 401 are mapped to a distributed RU 406 in accordance with a distributed tone plan.

Aspects of the present disclosure recognize that by distributing the tones across a wider bandwidth, the per-tone transmit power of a logical RU 404 may be increased to provide greater flexibility in medium utilization for PSD-limited wireless channels. For example, when mapped to an rRU such as logical RU 404, the transmit power of the logical RU 404 may be severely limited based on the PSD of the wireless channel. For example, the LPI power class limits the transmit power of APs 102 and STAs 104 to 5 dBm/MHz and −1 dBm/MHz, respectively, in the 6 GHz band. As such, the per-tone transmit power of the logical RU 404 is limited by the number of tones mapped to each 1 MHz subchannel of the wireless channel.

By enabling a STA 104 to map modulation symbols in a distributed manner onto noncontiguous tones interspersed throughout all or a portion of a wireless channel, distributed transmissions may enable an increase in the per-tone transmit power used for each individual distributed tone, and thus the overall transmit power of the PPDU, without exceeding the PSD limits of the wireless channel. As shown in the example of FIG. 4, STA 104 may map logical RU 404 to a set of 26 noncontiguous subcarrier indices spread across a 40 MHz wireless channel (also referred to herein as an exemplary "spreading bandwidth"). Compared to the tone mapping described above with respect to the legacy tone plan, the distributed tone mapping depicted in FIG. 4 effectively reduces the number of tones (of the logical RU 404) in each 1 MHz subchannel. For example, each of the 26 tones can be mapped to a different 1 MHz subchannel of the 40 MHz channel. As a result, each AP 102 or STA 104 implementing the distributed tone mapping of FIG. 4 can maximize its per-tone transmit power (which may maximize the overall transmit power of the logical RU 404).

In some examples (not shown in FIG. 4), multiple logical RUs may be mapped to interleaved subcarrier indices of a shared wireless channel. For example, STA 104 may modulate a portion of the symbols on a number of tones representing multiple logical RUs to noncontiguous subcarrier indices associated with a shared wireless channel in accordance with a distributed tone plan. Furthermore, distributed transmissions by multiple STAs 104 may be multiplexed onto different sets of distributed tones of a shared wireless channel such as to enable an increase in the transmit power of each device without sacrificing spectral efficiency. Such increases in transmit power can be combined with some MCSs to increase the range and throughput of wireless communications on PSD-limited wireless channels. Distributed transmissions also may improve packet detection and channel estimation capabilities.

To support distributed transmissions, new packet designs and signaling are needed to indicate whether a PPDU 402 is transmitted on tones spanning rRU 404 (according to a legacy tone plan) or dRU 406 (according to a distributed tone plan). For example, the IEEE 802.11be standard amendment or earlier versions of the IEEE 802.11 family of wireless communication protocol standards define a trigger frame format which can be used to solicit the transmission of a trigger-based (TB) PPDU from one or more STAs 104. The trigger frame allocates resources to the STAs 104 for the transmission of the TB PPDU and indicates how the TB PPDU is to be configured for transmission. For example, the trigger frame may indicate a logical RU or MRU allocated for transmission in the TB PDDU. In some examples, the trigger frame may be further configured to carry tone distribution information indicating whether the logical RU (or MRU) maps to a rRU or a dRU.

In some implementations, a STA 104 may include a distributed tone mapper that maps the logical RU 404 to the dRU 406 in the frequency domain. The dRU 406 is then converted to a time-domain signal (such as by an inverse fast Fourier transform) for transmission over a wireless channel. The AP 102 may receive the time-domain signal and reconstruct the dRU 406 (such as by a fast Fourier transform). In some implementations, the AP 102 may include a distributed tone demapper that demaps the dRU 406 to the logical RU 404. In other words, the distributed tone demapper reverses the mapping performed by the distributed tone mapper at the STA 104. The AP 102 can then recover the information carried (or modulated) on the logical RU 404 as a result of the demapping.

In the example of FIG. 4, the logical RU 404 is distributed evenly across the spreading bandwidth. While the example shown in FIG. 4 illustrates a spreading bandwidth of 40 MHz, spreading bandwidths also may include 80 MHz, 160 MHz, or 320 MHz. In some implementations, the logical RU 404 can be mapped to any suitable pattern of noncontiguous subcarrier indices. For example, in various implementations, the distance between any pair of adjacent modulated tones may be less than or greater than the distances depicted in FIG. 4.

Figure 5:
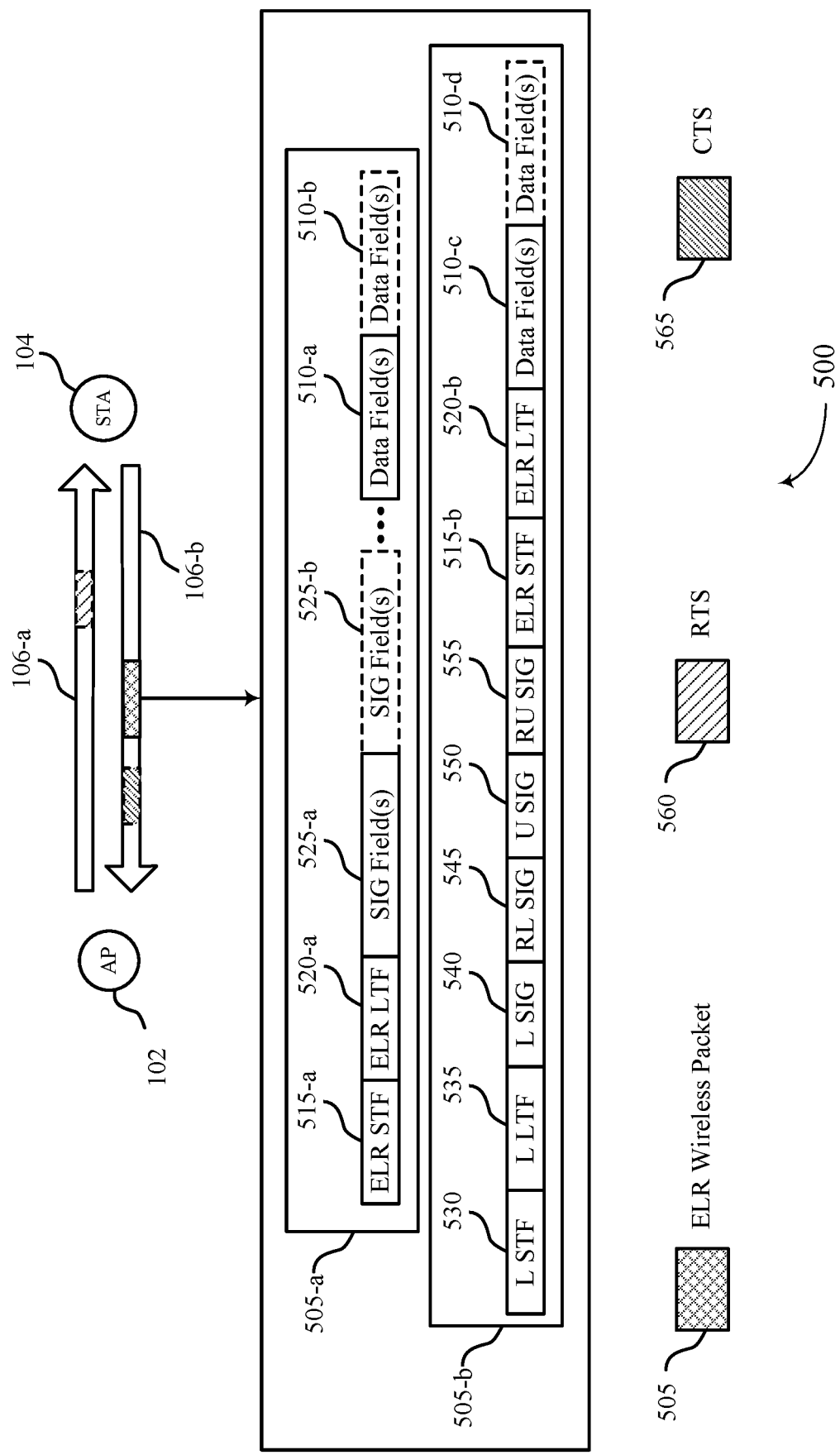
FIG. 5 shows an example signaling diagram that supports modulation of extended long range (ELR) wireless packets.

FIG. 5 shows an example signaling diagram 500 that supports modulation of ELR wireless packets. In some implementations, the signaling diagram 500 may implement aspects of the wireless communication network 100, the PDU 200, the PPDU 300, the frequency diagram 400, or any combination thereof. The signaling diagram 500 illustrates communication between one or more APs, such as an AP 102, and/or one or more STAs, such as a STA 104. The AP 102 may be an example of an AP 102 described with reference to FIG. 1. The STA 104 may be an example of a STA 104 described with reference to FIG. 1.

In some implementations, an AP 102 may transmit wireless packets to a STA 104 via a communication link 106-a. Similarly, the AP 102 may receive wireless packets from the STA 104 via a communication link 106-b. The processes described as being performed by the STA 104 may additionally, or alternatively, be performed at the AP 102. For example, the signaling described as being sent from the STA 104 to the AP 102 may additionally, or alternatively, be sent from the AP 102 to the STA 104. Similarly, the signaling described as being sent from the AP 102 to the STA 104 may additionally, or alternatively, be sent from the STA 104 to the AP 102.

In some WLANs, one or more wireless devices, such as wireless STAs 104 and/or wireless APs 102, may extend a distance, or coverage range, over which wireless coverage is provided. The coverage range may be a distance to which the AP 102 provides service to one or more STAs, such as the STA 104. In some implementations, if the STA 104 exceeds a threshold distance from the AP 102, the STA 104 may be outside of the coverage range. The threshold distance may depend on how far signaling between the STA 104 and the AP 102 reliably travels. The wireless devices may operate using a relatively low frequency band, such as a 2.4 GHz frequency band, rather than a higher frequency band, such as a 5 GHz or 6 GHz frequency band, because the lower frequency band may use a longer wave, which may improve the coverage range and provide improved transmission through objects. Such wireless communication systems may be referred to as LR wireless communication systems. However, one or more wireless devices may still be outside of the coverage range of an LR wireless communication system. Further, the data rate of the communications in the LR wireless communication system may be relatively low due to slower transmission time using longer waves, which may cause latency and relatively low throughput when compared with a OFDM-based system that uses the same or a higher frequency band.

In some implementations, to improve signaling throughput and efficiency while maintaining a coverage range for the LR wireless communication system, the AP 102, the STA 104, or both may transmit a wireless packet having duplications to at least a data field. For example, the STA 104 may transmit a first ELR wireless packet 505-a with duplications to SIG fields 525-a and duplications to the data portion 510-b. Additionally, or alternatively, the STA 104 may transmit a second ELR wireless packet 505-b with duplications to the data portion 510-c. That is, generally, the STA 104 may transmit an ELR wireless packet 505 with duplications to at least the data portions. In other words, the ELR wireless packet 505 may have a format to support the duplications of at least the data portions (or one or more additional portions, such as a preamble portion, such as a SIG field within the preamble portion). Additional examples of ELR packet formats are described elsewhere herein, including with reference to FIG. 17.

The ELR wireless packet 505 may provide for increased signaling throughput and efficiency, extended range, or the like when compared with other LR wireless packet protocols. For example, the ELR wireless packet 505 may have a target data rate, such as a modulation and coding scheme (MCS) target data rate, where the MCS specifies a data rate, a channel bandwidth, and/or a number of antennas or spatial streams at a transmitting wireless communication device. The MCS may be MCS0 with 3 repetitions of the ELR wireless packet 505, with a data rate of about 2.7 megabits per second (Mbps). MCS0 may have an index 0 and a relatively low data rate (such as compared to other MCSs).

In some implementations, the ELR wireless packet 505 may provide for an approximately 6 dB gain over MCS0. The approximately 6 dB gain may mitigate and/or balance a power imbalance between uplink transmissions and downlink transmissions, or may otherwise enable greater transmit powers for downlink communication. For example, uplink transmissions may be associated with an approximately 6 dB gain over downlink transmissions, and the format of the ELR wireless packet 505 may compensate for this, or may otherwise increase a potential upper limit transmit power of downlink transmissions. In some implementations, a duplication (such as a 4× duplication) for the SIG and/or data portion may account for (such as be equal to, enable, or achieve) the approximately 6 dB gain. Additionally, or alternatively, the ELR wireless packet 505 may achieve the approximately 6 dB gain via a dRU transmission. For example, the STA 104 may transmit the ELR wireless packet 505 via a dRU, which may be described further elsewhere herein, including with reference to FIG. 4. The duplication for the SIG and/or data portion may be associated with a 1× symbol duration and/or a 4× symbol duration.

In some implementations, the ELR wireless packet 505 may be a single-user wireless packet. For example, the ELR wireless packet 505 may have a format specific to a single-user, such as a single-user PPDU format. In other words, the ELR wireless packet 505 may have a format specific to a single receiver, such as the AP 102, rather than multiple receivers.

The first ELR wireless packet 505-a may, in some aspects, be associated with a greenfield (GF) wireless packet (if, for example, use of the first ELR wireless packet 505-a is associated with, such as limited or exclusive to, devices having a capability associated with ELR communication). The first ELR wireless packet 505-a may include a minimal quantity of fields compared to other packet formats. In other words, the first ELR wireless packet 505-a may include a minimized quantity of fields such that an overhead associated with communicating the packet is reduced (such as compared to ELR wireless packets with greater quantities of fields).

The first ELR wireless packet 505-a may include an ELR-STF 515-a. The ELR-STF 515-a may be accommodate a gain greater than or equal to 3 dB for power boosting for power boosting and/or be associated with a relatively larger carrier frequency offset (CFO) (such as compared to other STFs). The ELR-STF 515-a may be an ultra-high reliability (UHR) STF. The first ELR wireless packet 505-a also may include an ELR-LTF 520-a. The ELR-LTF 520-a may accommodate a gain greater than or equal to 3 dB for power boosting and/or may be referred to as a UHR LTF.

The first ELR wireless packet 505-a may include SIG fields 525-a and/or duplications of the SIG fields 525-b. For example, the first ELR wireless packet 505-a may include up to four duplications of the SIG fields 525-a. In other words, the first ELR wireless packet 505-a may include a 4× repetition of the SIG fields 525-a. The STA 104 may achieve a target data rate by using an MCS, such as MCS14, with the 4× repetition for the SIG fields 525-a. In some aspects, a SIG field 525-a may be associated with an ELR communication mode and, accordingly, may be referred to or understood as an ELR-SIG field, such as a UHR-ELR-SIG field.

The first ELR wireless packet 505-a may include the data portion 510-a and/or duplications of the data portion 510-b. Similarly to the SIG fields 525-a, the data portion 510-a may be duplicated in accordance with a duplication scheme that is associated with an ELR communication mode. For example, the first ELR wireless packet 505-a may include up to four duplications of the data portion 510-a, or, in other words, a 4× repetition of the data portion 510-a. The STA 104 may achieve a target data rate by using an MCS, such as MCS14, with the 4× repetition for the data portion 510-a.

Generally, the first ELR wireless packet 505-a may transmit the SIG fields 525-a and data portion 510-a (and repetitions of the SIG fields 525-b and data portion 510-b) using a same numerology after the ELR-LTF 520-a, where the SIG fields 525-a and the data portion 510-a are associated with a 1× or 4× symbol duration. In other words, SIG and data fields may be transmitted with a same numerology after the ELR-LTF 520-a, either with 1× or 4× symbols. A data portion 510-a, a data portion 510-b, a data portion 510-c, and/or a data portion 510-d may each be understood as one or more data fields.

The second ELR wireless packet 505-b may be a mixed mode packet format and/or may be referred to as a combination of a legacy preamble plus ELR preamble. The second ELR wireless packet 505-b may include a legacy portion, which may not be duplicated. In other words, the second ELR wireless packet 505-b may include a legacy portion at 1× symbol duration, including an L-STF 530, an L-LTF 535, an L-SIG 540, and a repetition of L-SIG, RL-SIG 545, and a repetition of U-SIG 550, RU-SIG 555. That is, the second ELR wireless packet 505-b may include a legacy portion at the 1× symbol duration that matches a L-LTF. The L-STF 530 and/or the L-LTF 535 may accommodate a gain greater than or equal to 3 dB for power boosting.

Additionally, or alternatively, the second ELR wireless packet 505-b may include an ELR portion. For example, the second ELR wireless packet 505-b may include an ELR-STF 515-b, an ELR-LTF 520-b, data portion 510-c, and duplications of the data portion 510-d. In other words, the second ELR wireless packet 505-b may include SIG fields, including the U-SIG 550 and the RU-SIG 555, prior to the ELR-STF 515-b and the ELR-LTF 520-b in contrast to the first ELR wireless packet 505-a, where the SIG fields 525-a follow the ELR-STF 515-a and the ELR-LTF 520-a. Additionally, or alternatively, the ELR-STF 515-b and the ELR-LTF 520-b may accommodate a gain greater than or equal to 3 dB for power boosting. In some implementations, the ELR-STF 515-b and/or the ELR-LTF 520-b may support the ELR portion when, for example, the STA 104 supports beamforming. Alternatively, the STA 104 may drop or skip the ELR-STF 515-b and/or the ELR-LTF 520-b, for example, when beamforming is not supported and/or when a 1× symbol duration is used for data at the STA 104.

In some implementations, the U-SIG 550 and/or the RU-SIG 555 may use an MCS, such as MCS15. The U-SIG 550 and the RU-SIG 555 may be referred to as a U-SIG1 and RU-SIG1, respectively. The second ELR wireless packet 505-b may include up to four duplications of the data portion 510-c, or, in other words, a 4× repetition of the data portion 510-c. Additionally, or alternatively, the STA 104 may achieve a target data rate by using an MCS, such as MCS14, with the 4× repetition for the data portion 510-c.

In some implementations, the STA 104 may transmit the ELR wireless packet 505 via a dRU. For example, the STA 104 may transmit the ELR wireless packet 505 via a resource allocation associated with a dRU, such as a dRU including 52 tones, and via a frequency range, such as a 20 MHz frequency range. In some examples, transmitting the ELR wireless packet 505 via the dRU may support power boosting, such as approximately 6 dB per tone power boosting, and/or range extension.

For example, spreading the ELR wireless packet 505 over the 52 tones, which may be fewer than a quantity of tones typically used to transmit an ELR wireless packet, may be associated with increased (or boosted) per tone power for the transmission. Additionally, or alternatively, the transmission of the ELR wireless packet 505 via the dRU may satisfy a power spectral density (PSD) threshold. Further, in implementations in which the STA 104 transmits the ELR wireless packet 505 via the dRU, the STA 104 may apply a power backoff to meet a mask (such as a spectral mask that limits a permitted power distribution across each channel used to transmit the ELR wireless packet 505).

When the STA 104 transmits the ELR wireless packet 505 via the dRU, the ELR wireless packet 505 may be associated with a 4× numerology. For example, the ELR wireless packet 505 may include a 4× numerology for a SIG portion and a data portion in the case of a format of the first ELR wireless packet 505-a (such as a GF packet format) or a 4× numerology for a data portion in the case of a format of the second ELR wireless packet 505-b (such as a mixed mode packet format).

Additionally, or alternatively, the STA 104 may produce 4× duplication for at least the data portion (and also an ELR-SIG field portion) via a duplication scheme, which may be applicable to both 1× and 4× symbols. The duplication scheme may include a coded bit duplication scheme, a time domain duplication scheme, a frequency domain duplication scheme, or any combination thereof. The duplication schemes and combinations of the duplication schemes, which may be referred to as hybrid duplication schemes, are described in further detail elsewhere herein, including with reference to FIGS. 6-17.

The STA 104 may transmit the ELR wireless packet 505 after exchanging a request to send (RTS) 560, a clear to send (CTS) 565, or both. For example, the STA 104 may request to transmit the ELR wireless packet 505, for example, after identifying information to include in the ELR wireless packet 505. The AP 102 may, based on receiving the request to transmit the ELR wireless packet 505, which may be the RTS 560, transmit an indication to transmit the ELR wireless packet 505. In other words, the AP 102 may transmit the CTS 565 to the STA 104. In some implementations, the STA 104 may transmit the ELR wireless packet 505, such as the ELR wireless packet having the duplications to at least the data portion (and also to the ELR-SIG field portion), to the AP 102 based on (such as in accordance with) receiving the CTS 565.

Figure 6:
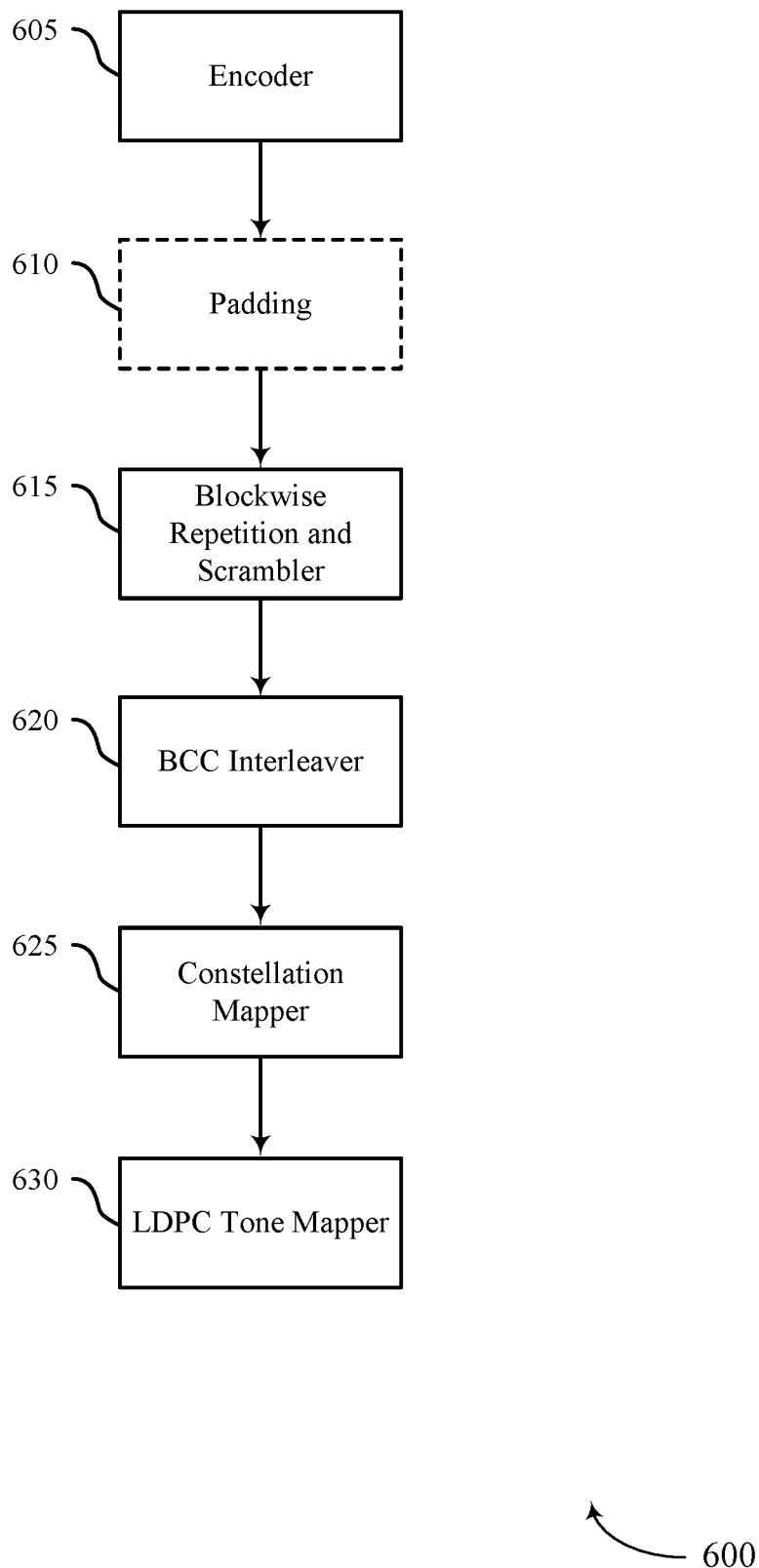
FIGS. 6 and 7 show example flowcharts that support modulation of ELR wireless packets.

FIG. 6 shows an example flowchart 600 that supports modulation of extended (such as or enhanced) long range wireless packets. In some examples, the flowchart 600 may implement or be implemented by aspects of the wireless communication network 100, the PDU 200, the PPDU 300, the frequency diagram 400, the signaling diagram 500 or any combination thereof as described with reference to FIGS. 1-5. For example, the flowchart 600 may be implemented by a wireless device such as a STA, which may be an example of the STA 104 as described with reference to FIG. 1 and/or FIG. 5. Alternative examples of the following may be implemented, where some steps are performed in a different order than described or are not performed at all. In some examples, steps may include additional features not mentioned below, or further steps may be added.

The wireless device may encode bits for a packet, such as an ELR wireless packet 505 described with reference to FIG. 5, to include duplications of portions of the packet, such as a data portion 510 (which may refer generally to any one of the data portion 510-a, the data portion 510-b, the data portion 510-c, and the data portion 510-d) described with reference to FIG. 5. In other words, the wireless device may produce duplications of one or more portions of a packet in accordance with a coded bit duplication scheme, with such one or more portions of the packet including an ELR-SIG field portion or a data portion, or both.

In some implementations, the wireless device may produce duplications prior to interleaving. In some aspects, the wireless device may use (such as reuse, as compared to a legacy option in which portions of the packet are not duplicated) a binary convolutional coding (BCC) and/or low-density parity check (LDPC) interleaver. Additionally, or alternatively, the wireless device may harvest frequency diversity gain when performing duplication combining. In some aspects, the duplication of coded bits may not be associated with throughput and/or tone efficiency loss (such as compared to other duplication schemes). The wireless device may apply the coded bit duplication scheme to 1× symbol durations and/or 4× symbol durations.

For example, at 605, the wireless device may encode bits for the packet according to a coding rate. The wireless device, in some examples, also may apply a forward error correction (FEC), such as a ½ FEC. In other words, the wireless device may code a first bit and leave a second bit uncoded for a ½ rate convolutional code.

At 610, the wireless device may perform post FEC padding. For example, the wireless device may add one or more bits to the packet, if necessary, to achieve a standard size of bits for the transmission.

At 615, the wireless device may produce the duplications according to a blockwise repetition procedure. For example, the wireless device may produce 2× duplications (such as when combining the coded bit duplication scheme with another duplication scheme) or 4× duplications using the blockwise repetition procedure. Additionally, or alternatively, the wireless device may apply a scrambling sequence to the duplications. In other words, the wireless device may apply the scrambling sequence to duplications of bits produced via the blockwise repetition procedure, which may include duplications of a data portion and/or one or more additional portions of the packet. In some implementations, the wireless device may apply the scrambling sequence to reduce a peak-to-average power ratio (PAPR).

For example, prior to producing the duplication, the coded bits may include a stream of 12 coded bits [C1 . . . C12] in each 64-fast Fourier transform (FFT) OFDM symbol. The output of the bit stream, for example, after the blockwise repetition procedure, may be $C_{out}$=[[C1 . . . C12], [C1 . . . C12, C1 . . . C12, C1 . . . C12] XOR S]. That is, the output may include the original 12 coded bits and three duplications of the 12 coded bits for a total of 48 coded bits. The wireless device may apply the scrambling sequence to the output of the bit stream, $C_{out}$, to reduce the PAPR. S may be a scrambling sequence to reduce the PAPR and may include a permutation of 0s and 1s.

In some implementations, after producing the duplications, the wireless device may, at 620 apply a BCC interleaver. For example, the wireless device may apply the BCC interleaver to the duplicated portion of the packet, which may include at least the data portion. Additionally, or alternatively, at 625, the wireless device may apply a constellation mapper, and, at 630, the wireless device may apply an LDPC tone mapper. In accordance with the operations of the flowchart 600 (such as in accordance with the coded bits repetition), the wireless device may transmit the packet over-the-air (OTA).

Figure 7:
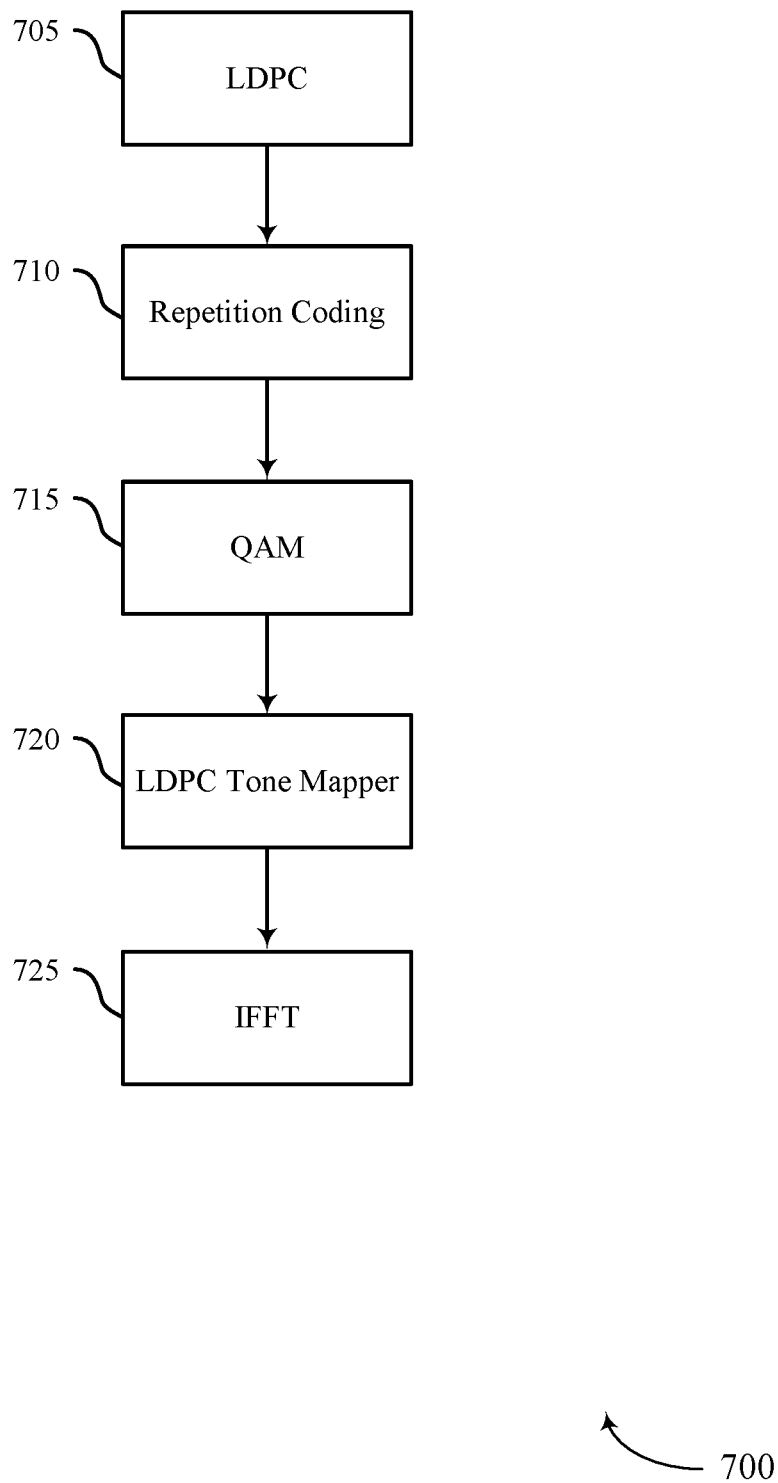

FIG. 7 shows an example flowchart 700 that supports modulation of ELR wireless packets. In some examples, the flowchart 700 may implement or be implemented by aspects of the wireless communication network 100, the PDU 200, the PPDU 300, the frequency diagram 400, the signaling diagram 500, or any combination thereof as described with reference to FIGS. 1-5. For example, the flowchart 700 may be implemented by a wireless device such as a STA, which may be an example of the STA 104 as described with reference to FIG. 1 and/or FIG. 5. Alternative examples of the following may be implemented, where some steps are performed in a different order than described or are not performed at all. In some examples, steps may include additional features not mentioned below, or further steps may be added.

The wireless device may encode bits for a packet, such as an ELR wireless packet 505 described with reference to FIG. 5, to include duplications of portions of the packet, such as a data portion 510 described with reference to FIG. 5. In other words, the wireless device may produce duplications of one or more portions of a packet in accordance with a coded bit duplication scheme.

At 705, the wireless device may perform an LDPC encoding on bits to be included in the packet. That is, the wireless device may perform the LDPC encoding prior to producing the duplications of portions of the packet, such as prior to applying repetition coding.

At 710, the wireless device may perform repetition coding. For example, the wireless device may encode data of the packet (or another portion to be duplicated) according to an LDPC coding scheme, and may encode the LDPC coded bits according to a repetition coding scheme. In such examples, the wireless device may produce duplications of at least the data in accordance with concatenating the LDPC coding scheme with the repetition coding scheme and repeating LDPC encoded bits (by, for example, a quantity associated with a duplication scheme that pertains to an ELR communication mode). In some examples, repetition coding may support range extension when applied as an inner coding method. For example, the wireless device may support range extension by using repetition coding as an inner coding method and BCC or LDPC as an outer coding method. In some aspects, coded bit repetition may provide near optimal gain and minimal change (such as compared to a legacy coding method).

Additionally, or alternatively, a coded bit with 4× duplication with LDPC may be applied to a data portion, such as ELR data, to improve a coding gain and range. For example, the wireless device may concatenate LDPC code (such as outer code) with repetition coding (such as inner code). Additionally, or alternatively, the wireless device may produce a quantity of duplications (such as repetitions) of LDPC encoded bits, such as 4× duplications. In other words, in accordance with performing the repetition coding (4×), the wireless device may concatenate the LDPC code (an outer code) with repetition coding (an inner code) and may repeat the LDPC encoded bits by 4 times.

After producing the duplications via the repetition coding at 710, the wireless device pay perform a quadrature amplitude modulation (QAM) at 715, perform LDPC tone mapping at 720, and/or perform an inverse fast Fourier transform (IFFT) at 725. In accordance with the operations of the flowchart 700 (such as in accordance with coded bits (4× duplication) with LDPC), the wireless device may transmit the packet OTA.

Figure 8:
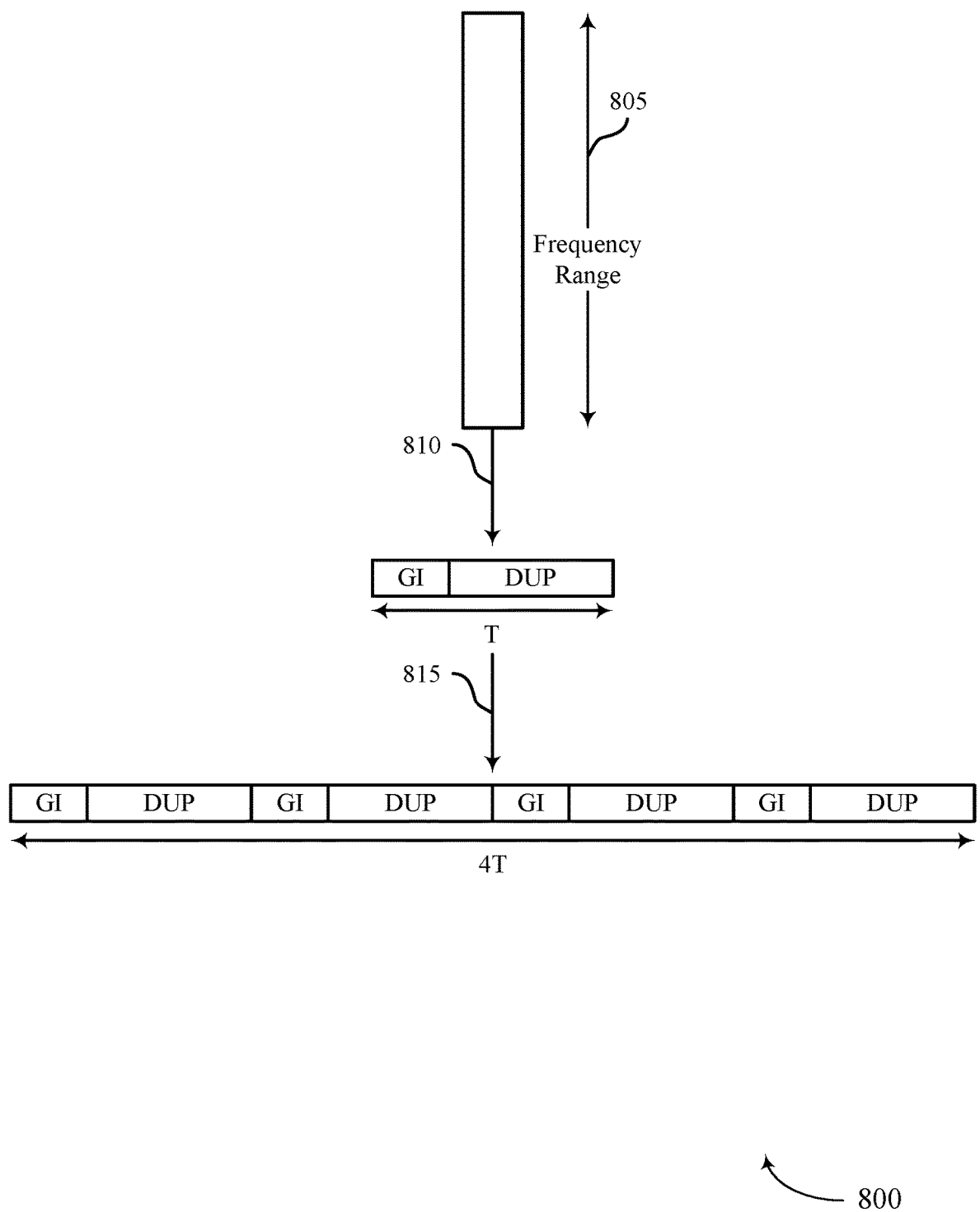
FIGS. 8 and 9 show example duplication schemes that support modulation of ELR wireless packets.

FIG. 8 shows an example duplication scheme 800 that supports modulation of extended (such as enhanced) long range wireless packets. In some examples, the duplication scheme 800 may implement or be implemented by aspects of the wireless communication network 100, the PDU 200, the PPDU 300, the frequency diagram 400, the signaling diagram 500, or any combination thereof as described with reference to FIGS. 1-5. For example, the duplication scheme 800 may be implemented by a wireless device such as a STA, which may be an example of the STA 104 as described with reference to FIG. 1 and/or FIG. 5.

The wireless device may duplicate symbols in a time domain for a packet, such as an ELR wireless packet 505 described with reference to FIG. 5, such that the packet includes duplications of one or more portions, such as a data portion 510 described with reference to FIG. 5. In other words, the wireless device may produce duplications of one or more portions of a packet in accordance with a time domain duplication scheme.

The time domain duplication scheme may be a low complexity scheme (such as relative to other duplication schemes) to harvest combining gain for range extension. In some examples, different interleaving may be applied to duplicated symbols to capture frequency diversity. The time domain duplication may be associated with truncation and/or resolution overhead. For example, each OFDM symbol may be duplicated to be 4 symbols after the wireless device performs the time domain duplication scheme, which may be associated with overhead in a SIG field and a last OFDM symbol as opposed to other repetition schemes.

The time domain duplication scheme may include a direct duplication (such as a 4× duplication) in the time domain. For example, a wireless device may transform data and/or a SIG field (such as an ELR-SIG field) in a frequency domain associated with a frequency range 805 to the time domain according to an IFFT 810. As an example, the data and/or SIG field in the frequency domain may range over 20 MHz and be associated with a 64-point (pt.) FFT. Additionally, or alternatively, the time domain duplication scheme may be associated with MCSO and/or a subcarrier spacing of 312.5 kHz.

After the IFFT 810, the data and/or SIG field may include a guard interval (GI) and a data/ELR-SIG duplication (DUP) spanning a time duration T (such as 4 us). The time duration T may include a duration for the GI (such as 0.8 us) and/or a duration for the data/ELR-SIG DUP (such as 3.2 us).

The wireless device may produce duplications 815 of the GI and data/ELR-SIG DUP. For example, the wireless device may produce 4× duplications. The time duration of the duplicated duration may increase proportionally to the duplications. That is, with a 4× duplication, the time duration T may increase by 4× (to 4T, such as 16 us). In some implementations, each duplication may be associated with a separate GI and/or a different interleaver.

The time domain duplication scheme, if implemented without interleaving diversity, may support phase tracking, may be associated with lower frequency diversity compared to other duplication schemes, and/or may have higher channel smoothing gain compared to other methods of time domain duplication.

Figure 9:
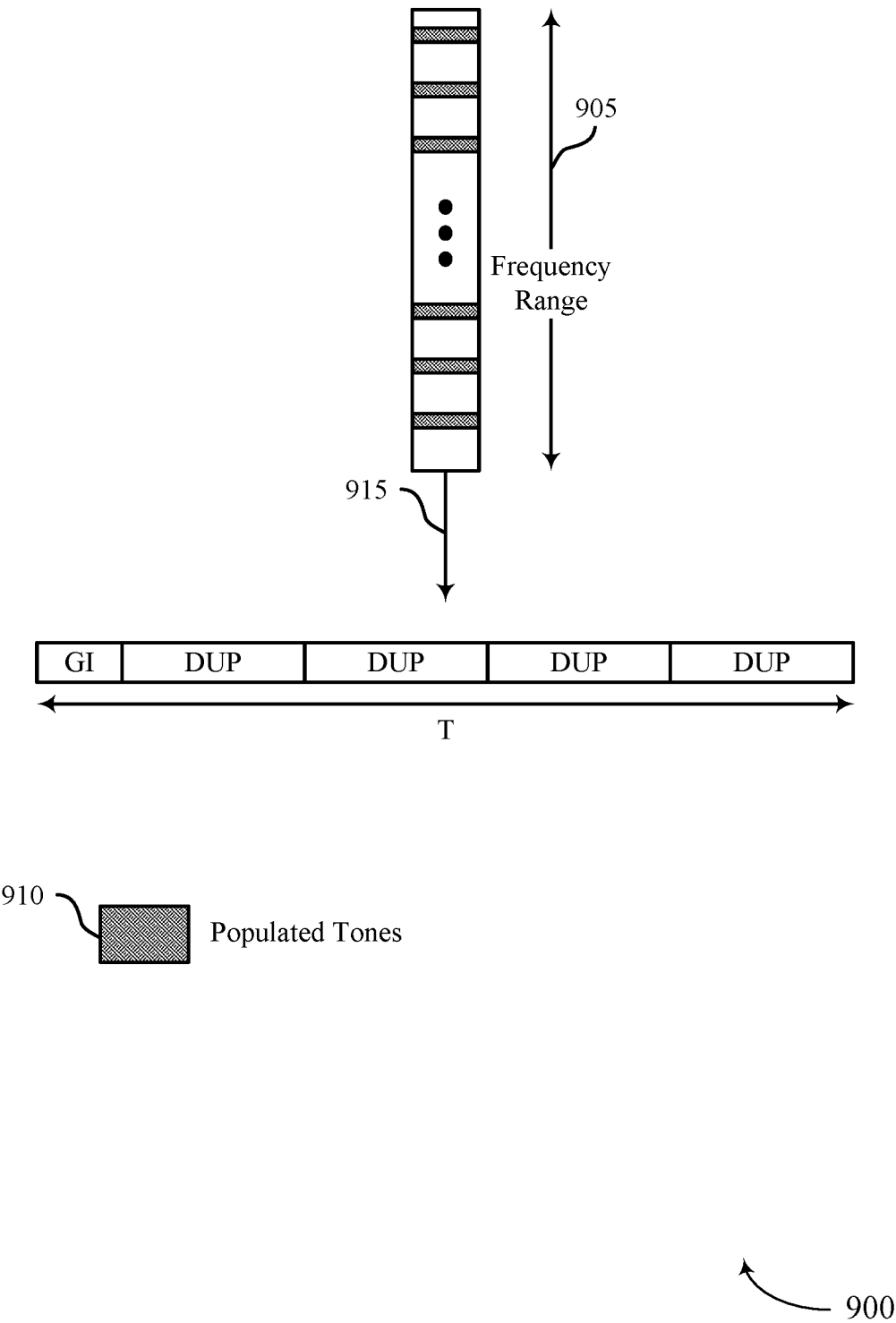

FIG. 9 shows an example duplication scheme 900 that supports modulation of extended (such as enhanced) long range wireless packets. In some examples, the duplication scheme 900 may implement or be implemented by aspects of the wireless communication network 100, the PDU 200, the PPDU 300, the frequency diagram 400, the signaling diagram 500 or any combination thereof as described with reference to FIGS. 1-5. For example, the duplication scheme 900 may be implemented by a wireless device such as a STA, which may be an example of the STA 104 as described with reference to FIG. 1 and/or FIG. 5.

The wireless device may duplicate symbols in a time domain for a packet, such as an ELR wireless packet 505 described with reference to FIG. 5, such that the packet includes duplications of one or more portions, such as a data portion 510 described with reference to FIG. 5. In other words, the wireless device may produce duplications of one or more portions of a packet in accordance with a time domain duplication scheme.

For example, the wireless device may populate a quantity of tones, such as every 4th tone, in a frequency domain with, as an example, a 4× symbol duration, to generate a 4× duplication of one or more portions of a packet in a time domain. In other words, the wireless device may populate tones of a frequency range 905 such that every 4th tone is a populated tone 910.

As an example, the frequency range 905 may be 20 MHz spanning 256-pt FFT. Additionally, or alternatively, the time domain duplication scheme may be associated with MCS0 and/or a subcarrier spacing of 78.125 kHz. In some implementations, the wireless device may populate 52 tones or 56 tones (such as an existing resource unit size). In other words, a quantity of tones populated may be based on a resource unit (RU) size. In some examples, the time domain duplication scheme may include a time domain duplication to support phase tracking.

The wireless device may populate the tones of the frequency range such that after an IFFT 915, the wireless device may produce a 4× duplication prepended by a single GI. In other words, the wireless device may allocate a modulated symbol every 4th tone. For example, the time domain duplication scheme may produce a 4× duplication of a portion of a packet with a single GI. In some examples, the GI may be a short GI (such as less than a microsecond, such as 0.8 microseconds). The inclusion of a single GI, as opposed to a GI for each DUP, may be associated with reduced GI overhead. For example, in accordance populating every 4th tone, T may be equal to 13.6 microseconds (T=12.8 us+GI (1×) 0.8 us=13.6 us).

The wireless device may apply the time domain duplication scheme to multiple portions, such as a data portion and/or a SIG (such as ELR-SIG field) portion of a packet, such as an ELR packet. In accordance with applying the time domain duplication scheme, the wireless device may transmit the packet OTA.

Figure 10:
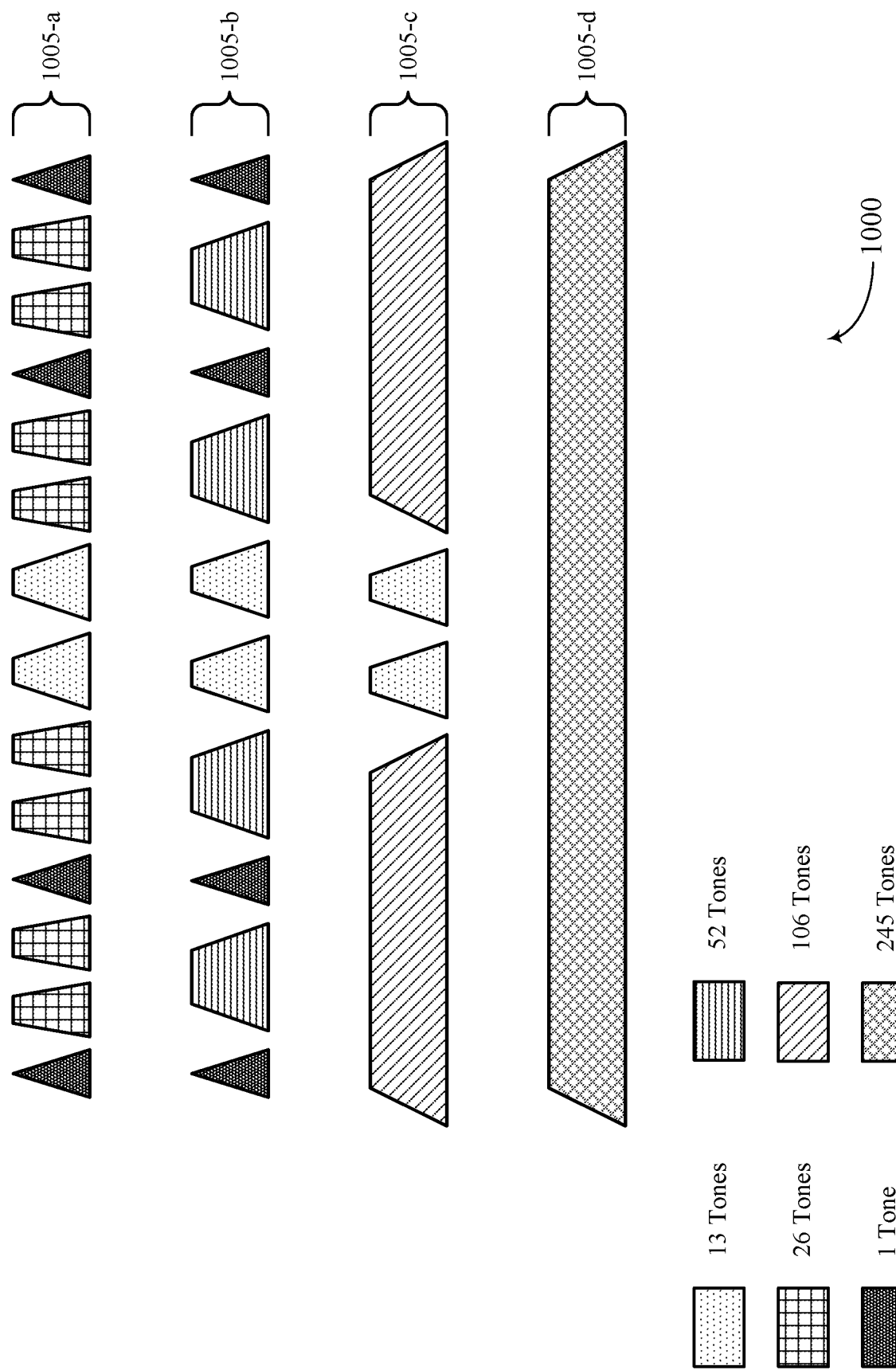
FIG. 10 shows example tone plans that support modulation of ELR wireless packets.

FIG. 10 shows example tone plans 1000 that support modulation of extended (such as enhanced) long range wireless packets. In some examples, the tone plans 1000 may implement or be implemented by aspects of the wireless communication network 100, the PDU 200, the PPDU 300, the frequency diagram 400, the signaling diagram 500 or any combination thereof as described with reference to FIGS. 1-5. For example, the tone plans 1000 may be implemented by a wireless device such as a STA, which may be an example of the STA 104 as described with reference to FIG. 1 and/or FIG. 5.

The wireless device may duplicate symbols in a frequency domain for a packet, such as an ELR wireless packet 505 described with reference to FIG. 5, such that the packet includes duplications of one or more portions, such as a data portion 510 described with reference to FIG. 5. In other words, the wireless device may produce duplications of one or more portions of a packet in accordance with a frequency domain duplication scheme.

The wireless device may modulate a portion of the packet according to an MCS and/or a resource allocation, where the resource allocation is associated with a quantity of duplications. The modulation, in some examples, may include a combination of binary phase-shift keying (BPSK), digital code modulation (DCM), and/or EHT duplications. For example, the DCM may produce a 2× duplication while the EHT duplications (which may be referred to as EHT-DUP) may produce an additional 2× duplication for a total 4× duplication. Additionally, or alternatively, the modulation may include the combination of BPSK and/or DCM. In some aspects, MCS14=BPSK+DCM+EHT-DUP, and MCS15=BPSK+DCM. In some aspects, MCS14 and/or MCS15 may be applied to a 20 MHz subchannel in accordance with (such as to achieve) a target data rate associated with an ELR communication mode, such as an ELR data rate.

In some examples, the wireless device may, to support the frequency domain duplication scheme, harvest a frequency diversity of an OFDM channel. The frequency domain duplication scheme may be associated with a higher smoothing gain as compared to, for example, a time domain duplication scheme.

The wireless device may apply the frequency domain duplication scheme for a 1× symbol (or 64-pt FFT) with 52 or 56 tones. In such examples, the frequency domain duplication scheme may include modulating the portions to be duplicated according to MCS15 for 26 tones and/or a duplication, such as an EHT duplication. The wireless device may use an additional 4 tones in the case of 56 tones as pilot tones and/or include an additional data signal (or other duplicated portion) with 4× tone duplication.

Additionally, or alternatively, the wireless device may apply the frequency domain duplication scheme for 4× symbol (or 256-pt FFT). In such examples, the wireless device may apply an MCS14 for a resource unit including 52 tones for a 4× duplication. For example, the wireless device may perform an MCS14-like transmission on RU52×4. Additionally, or alternatively, the wireless device may apply an MCS15 for a resource unit including 106 tones and/or apply an EHT duplication. In such examples, the wireless device may use MCS15 for RU106+EHT-DUP. The wireless device may apply one or more duplication schemes in accordance with a tone plan, such as a tone plan 1005-*a*, a tone plan 1005-*b*, a tone plan 1005-*c*, and/or a tone plan 1005-*d*. The tone plan 1005-*a*, the tone plan 1005-*b*, the tone plan 1005-*c*, and/or the tone plan 1005-*d* may include edge tones, such as 5 or 6 edge tones, and/or one or more direct current (DC) tones.

Figure 11:
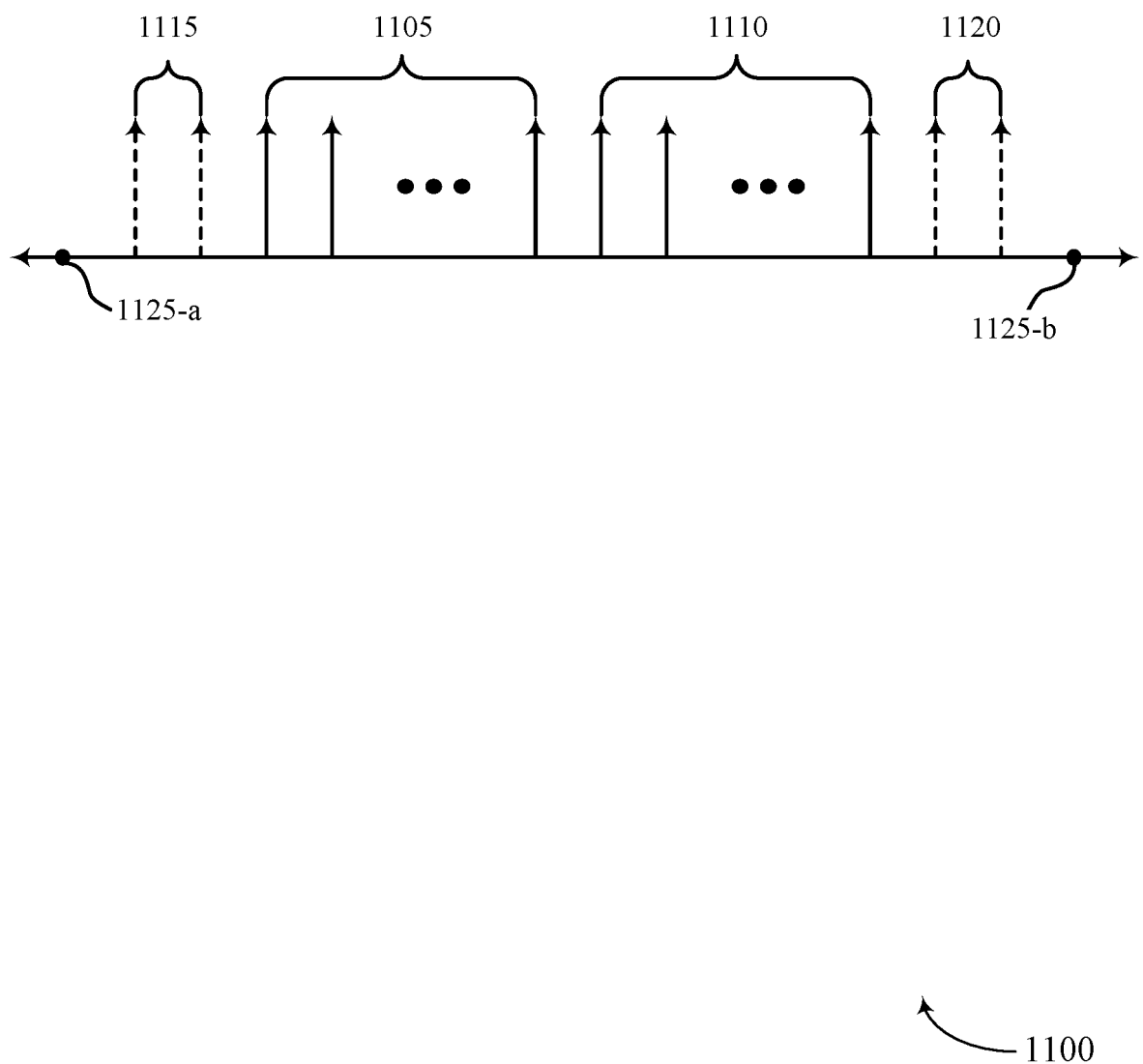
FIGS. 11-14 show example duplication schemes that support modulation of ELR wireless packets.

FIG. 11 shows an example duplication scheme 1100 that supports modulation of ELR wireless packets. In some examples, the duplication scheme 1100 may implement or be implemented by aspects of the wireless communication network 100, the PDU 200, the PPDU 300, the frequency diagram 400, the signaling diagram 500, or any combination thereof as described with reference to FIGS. 1-5. For example, the duplication scheme 1100 may be implemented by a wireless device such as a STA, which may be an example of the STA 104 as described with reference to FIG. 1 and/or FIG. 5.

The wireless device may duplicate symbols in a frequency domain for a packet, such as an ELR wireless packet 505 described with reference to FIG. 5, such that the packet includes duplications of one or more portions, such as a data portion 510 described with reference to FIG. 5. In other words, the wireless device may produce duplications of one or more portions of a packet in accordance with a frequency domain duplication scheme, such as one or both of a data portion and a SIG field (such as an ELR-SIG field) portion.

For example, the wireless device may apply one or more modulations and a tone duplication in accordance with the frequency domain duplication scheme. For example, the wireless device may apply a first modulation scheme, such as MCS15 (or a combination of MCS0 and DCM) to a first set of tones 1105, which, as an example, may include 26 tones. The wireless device may apply a second modulation scheme, such as MCS14, produce a duplication of the first set of tones 1105. However, the duplication may be associated with a high PAPR (such as compared to other duplication schemes). The wireless device may reduce the PAPR by applying a rotation, such as a 180 degree rotation to a third duplication (such as a third copy) of four total duplications (such as in a 4× duplication scheme). The duplicated tones with reduced PAPR may be a second set of tones 1110. In some implementations, the application of the 180 degree rotation to reduce the PAPR, in combination with the MCS14, may be referred to as an EHT-DUP. In some aspects, for example, the wireless device may use 26 tones (such as RU26) with DCM (MCS15)+EHT-DUP to duplicate one 26-tone to another.

The first set of tones 1105 and the second set of tones 1110 may be preceded and/or followed by a first set of edge tones 1115 and/or a second set of edge tones 1120, respectively. For example, the first set of edge tones 1115 may be a set of tones bordering a first edge 1125-a of the frequency domain, while the second set of edge tones 1120 may be a set of tones bordering a second edge 1125-b of the frequency domain.

In some implementations, the wireless device may use the first set of edge tones 1115 and/or the second set of edge tones 1120 as pilot tones (such as additional pilot tones) or an additional signal with 4× tone duplication. The first set of edge tones 1115 and/or the second set of edge tones 1120 may be associated with a case in which the wireless device uses 56 tones (such as 56 effective tones).

The first edge 1125-a and the second edge 1125-b may denote a start and end point of a frequency range, such as a 20 MHz frequency range. The range between the first edge 1125-a and the second edge 1125-b may be referred to as a spectrum line (such as a 20 MHz spectrum line). In some examples, the wireless device may apply the frequency domain duplication scheme to 52 or 56 effective tones and/or a 64-FFT. Additionally, or alternatively, the wireless device may apply the frequency domain duplication scheme to data fields and/or SIG fields.

Figure 12:
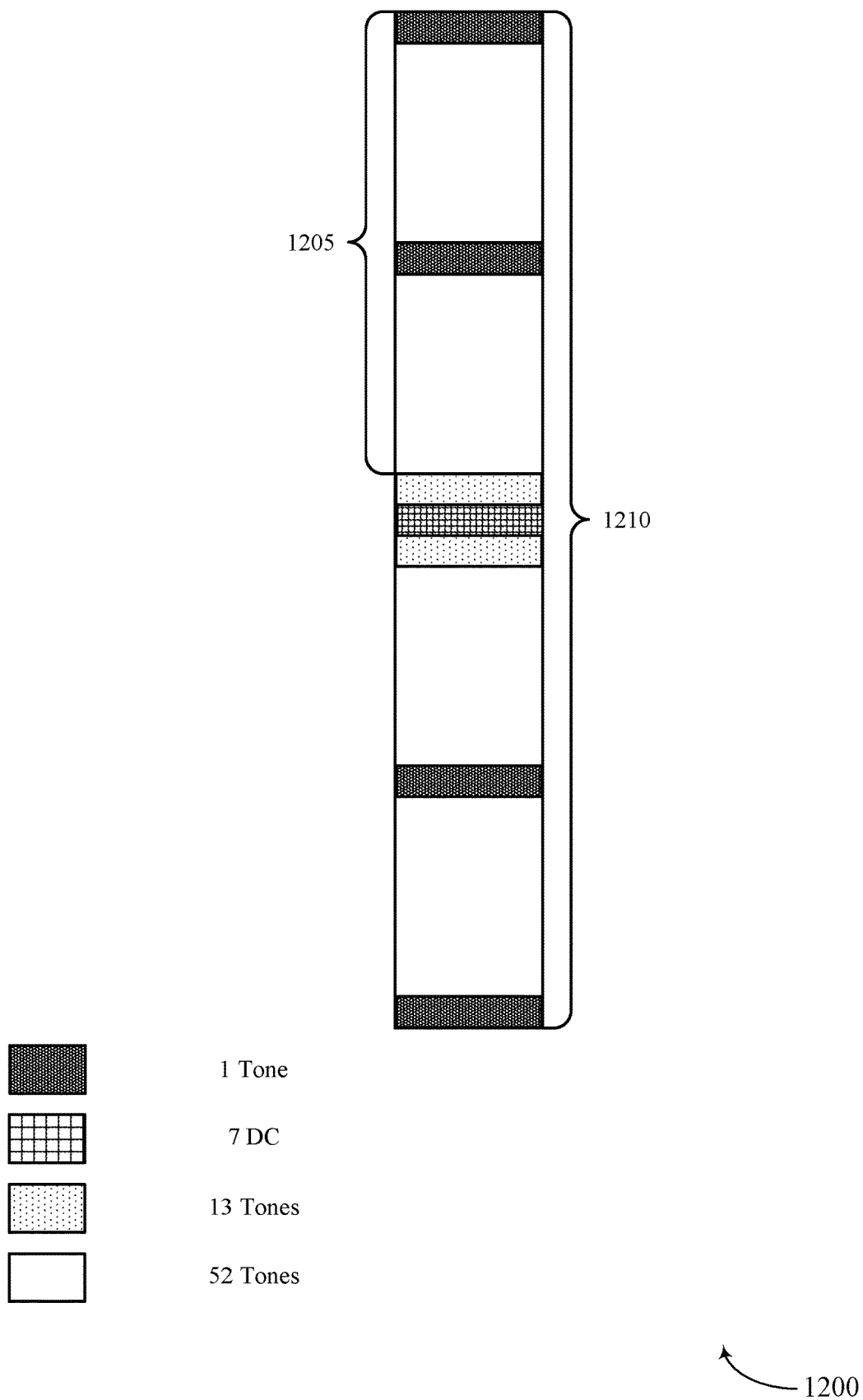

FIG. 12 shows an example duplication scheme 1200 that supports modulation of ELR wireless packets. In some examples, the duplication scheme 1200 may implement or be implemented by aspects of the wireless communication network 100, the PDU 200, the PPDU 300, the frequency diagram 400, the signaling diagram 500 or any combination thereof as described with reference to FIGS. 1-5. For example, the duplication scheme 1200 may be implemented by a wireless device such as a STA, which may be an example of the STA 104 as described with reference to FIG. 1 and/or FIG. 5.

The wireless device may duplicate symbols in a frequency domain for a packet, such as an ELR wireless packet 505 described with reference to FIG. 5, such that the packet includes duplications of one or more portions, such as a data portion 510 described with reference to FIG. 5. In other words, the wireless device may produce duplications of one or more portions of a packet in accordance with a frequency domain duplication scheme. The one or more portions may include a data portion or a SIG field (such as an ELR-SIG field or a UHR-ELR-SIG field) portion, or both.

For example, the frequency domain duplication scheme may include modulating one or more portions of the packet according to an MCS, such as an MCS14, and/or a resource allocation, such as a resource unit including 52 tones. The frequency domain duplication scheme may produce a 4× duplication with an associated data rate between approximately 1.5 Mbps and approximately 1.8 Mbps depending on a GI. In some implementations, the packet may be associated with a 4× symbol duration.

A tone plan for the frequency domain duplication scheme may include a DCM 1205 and, in some implementations, may be referred to as an EHT DUP 1210. For example, the frequency domain duplication scheme may follow a tone plan including the 52 tones and 4× symbol duration (such as an RU52×4 tone plan). The tone plan may be applied to one or more portions of the packet, including a UHR LTF and/or a data field.

A remaining 26 tones may be used as additional data tones with tone duplication and/or as pilot tones to support phase tracking. In some implementations, the tone plan may correspond to a frequency range of 20 MHz and/or 256-pt. FFT. In such implementations, the wireless device may support MCS14 for 20 MHz. The 20 MHz mode may be associated with an $N_{SD,short}$=15 and/or an $N_{SD}$=48.

Figure 13:
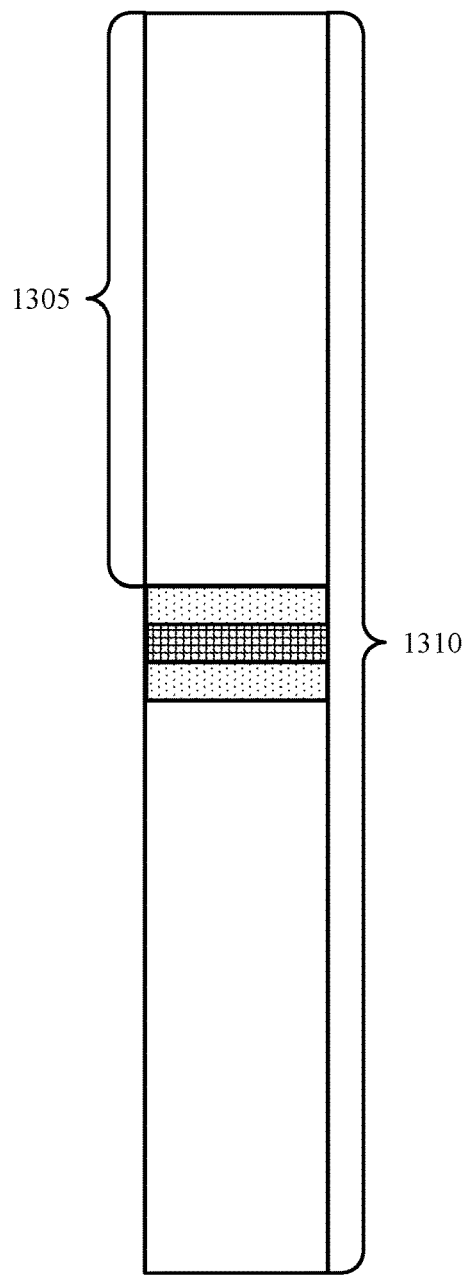
Figure 13:
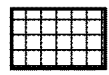
Figure 13:
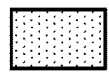
Figure 13:
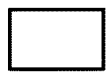

FIG. 13 shows an example duplication scheme 1300 that supports modulation of ELR wireless packets. In some examples, the duplication scheme 1300 may implement or be implemented by aspects of the wireless communication network 100, the PDU 200, the PPDU 300, the frequency diagram 400, the signaling diagram 500 or any combination thereof as described with reference to FIGS. 1-5. For example, the duplication scheme 1300 may be implemented by a wireless device such as a STA, which may be an example of the STA 104 as described with reference to FIG. 1 and/or FIG. 5.

The wireless device may duplicate symbols in a frequency domain for a packet, such as an ELR wireless packet 505 described with reference to FIG. 5, such that the packet includes duplications of one or more portions, such as a data portion 510 described with reference to FIG. 5. In other words, the wireless device may produce duplications of one or more portions of a packet in accordance with a frequency domain duplication scheme. The one or more portions may include a data portion or a SIG field (such as an ELR-SIG field or a UHR-ELR-SIG field) portion, or both.

For example, the frequency domain duplication scheme may include modulating one or more portions of the packet according to an MCS, such as an MCS15, and/or a resource allocation, such as a resource unit including 106 tones. For example, the wireless device may support MCS15 for RU106+EHT-DUP. The frequency domain duplication scheme may produce a 4× duplication with an associated data rate between approximately 1.6 Mbps and approximately 1.8 Mbps depending on a GI. In some implementations, the packet may be associated with a 4× symbol duration.

A tone plan for the frequency domain duplication scheme may include a DCM 1305 and, in some implementations, the tone plan may be referred to as an EHT DUP 1310. For example, the frequency domain duplication scheme may follow a tone plan including the 106 tones and associated with a 4× symbol duration (such as an RU106×2 tone plan). The tone plan may be applied to one or more portions of the packet, including a UHR LTF and/or a data field. In such aspects, the wireless device may apply MCS15 for RU106 on data and/or may apply EHT-DUP on MCS15 for RU106.

A remaining 26 tones (24 data tones and 2 pilot tones) may be used as additional data tones with tone duplication (such as additional data tones with 4× tone DUP) and/or as pilot tones to support phase tracking. In some implementations, the tone plan may correspond to a frequency range of 20 MHz and/or 256-pt FFT.

In some examples, the tone plan may be associated with a higher tone efficiency than other tone plans. Additionally, a data rate associated with the tone plan may be slightly higher than other tone plans due to non-integer information bit processing with DCM.

Figure 14:
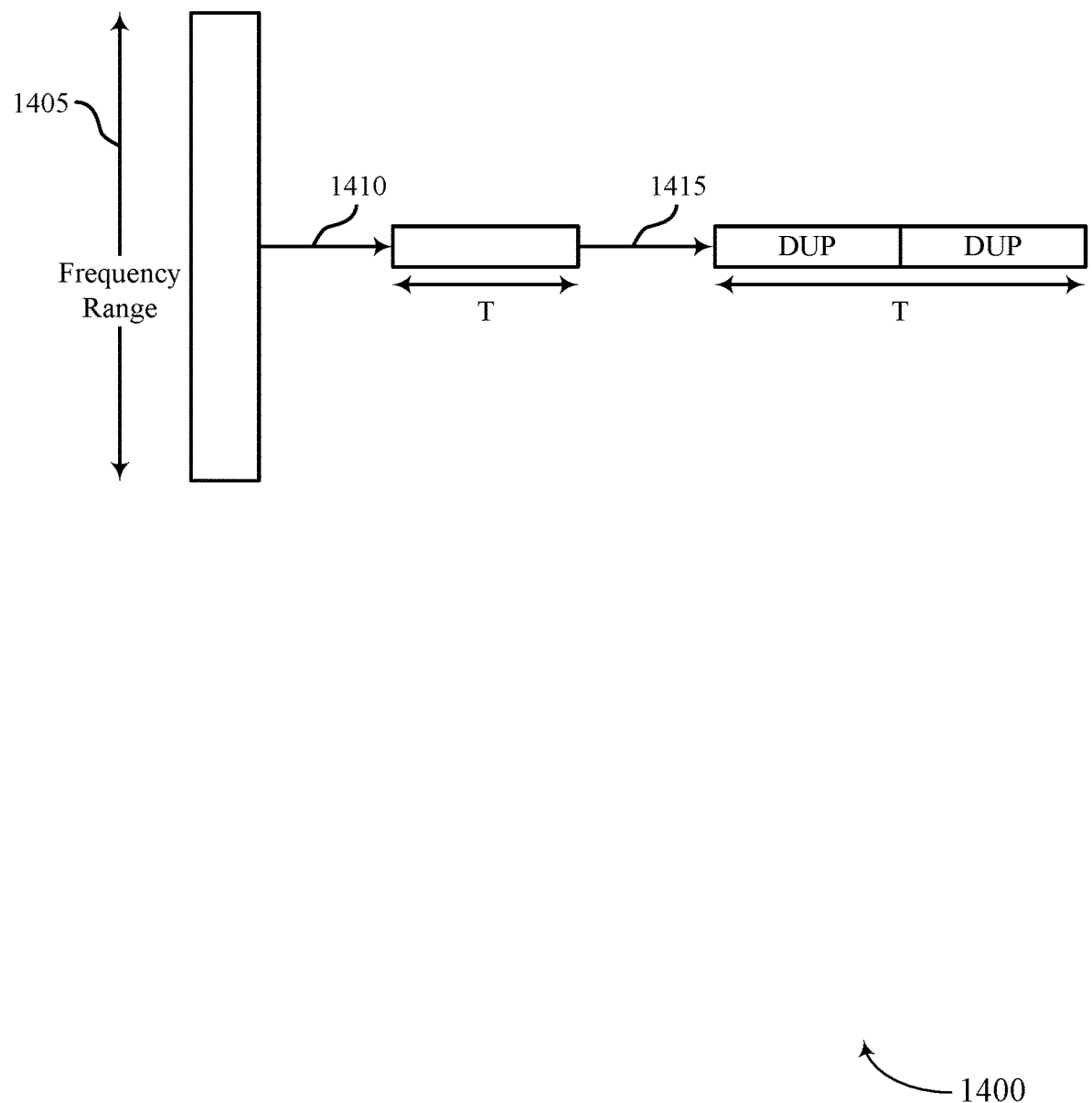

FIG. 14 shows an example hybrid duplication scheme 1400 that supports modulation of ELR wireless packets. In some examples, the hybrid duplication scheme 1400 may implement or be implemented by aspects of the wireless communication network 100, the PDU 200, the PPDU 300, the frequency diagram 400, the signaling diagram 500 or any combination thereof as described with reference to FIGS. 1-5. For example, the hybrid duplication scheme 1400 may be implemented by a wireless device such as a STA, which may be an example of the STA 104 as described with reference to FIG. 1 and/or FIG. 5.

The wireless device may duplicate symbols for a packet, such as an ELR wireless packet 505 described with reference to FIG. 5, according to two or more duplication schemes such that the packet includes duplications of one or more portions, such as a data portion 510 described with reference to FIG. 5. In other words, the wireless device may produce duplications of one or more portions of a packet in accordance with a hybrid duplication scheme. The one or more portions may include a data portion or a SIG field (such as an ELR-SIG field or a UHR-ELR-SIG field) portion, or both.

As described herein, a frequency domain duplication scheme (such as for 2× duplication) may be applied to both 1× and 4× symbol durations. Examples of hybrid duplication schemes described herein may include 4× numerology and/or tone plans. However, the hybrid duplication schemes may be applied to 1× symbol durations too by using a 1× tone plan with 64-pt FFT. Additionally, for time domain duplication schemes (such as for 2× duplication), direct duplication may either include interleaver diversity or not include interleaver diversity.

The wireless device may generate a signal (for transmission) by applying a frequency domain duplication followed by a time domain duplication. For example, the wireless device may apply the frequency domain duplication for 2× duplication and the time domain duplication for an additional 2× duplication. The frequency domain duplication may include applying a modulation in accordance with an MCS, such as MCS15, to a set of tones to be duplicated over a set of resources, such as 242 resource units and/or spanning a frequency range 1405, for example, of 20 MHz and/or 256-pt FFT size.

The wireless device may apply an IFFT 1410 to the set of tones to convert the tones in the frequency domain to the packet in the time domain. The packet may be associated with a time duration, for example, of 16 us, including a GI and a portion (such as a data portion). The wireless device may apply a time domain duplication 1415 directly to the packet to produce a 2× duplication spanning a time duration of, for example 32 us. In other words, the wireless device may produce a total 4× duplication for one or more portions of the packet via a 2× frequency domain duplication and a 2× time domain duplication. In other words, the wireless device may generate the packet for transmission by first using MCS15 on RU242 (20 MHz) to obtain 2× duplication in the frequency domain and then applying direct 2× duplication in the time domain to obtain the 2× duplication in the time domain.

Additionally, or alternatively, the wireless device may generate the signal by applying the frequency domain duplication (2×) followed by the time domain duplication (2×), where the frequency domain duplication includes applying a modulation and coding scheme, such as MCS15, on 52 tones or 56 tones in a 1 symbol duration (64-pt. FFT with 20 MHz). In other words, the 2× frequency domain duplication may be based on using MCS15 on 52 tones or 56 tones in 1 symbol duration (64-pt. FFT with 20 MHz). Then, the wireless device may apply direct 2× duplication in the time domain.

Figure 15:
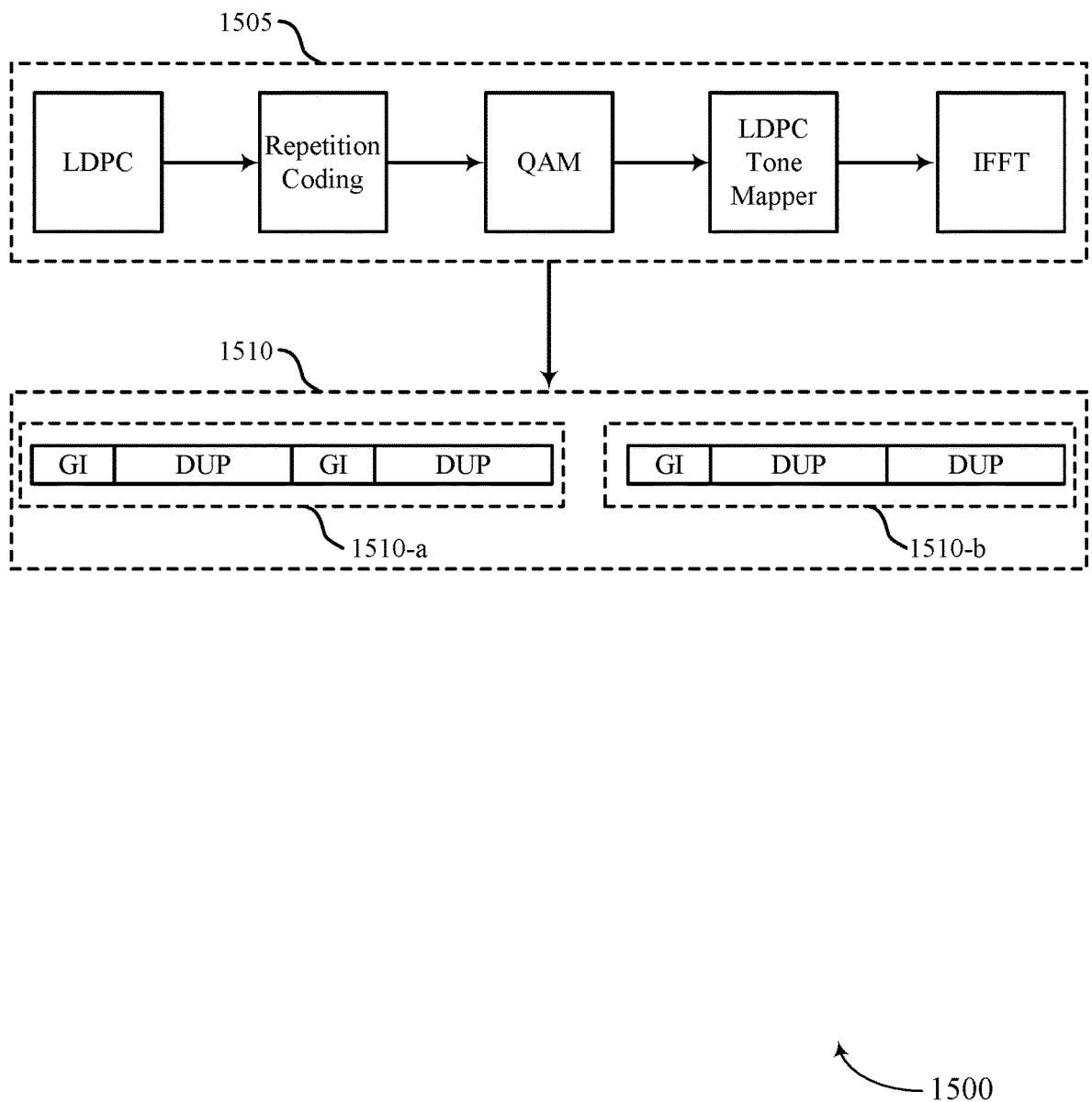
FIGS. 15 and 16 show example hybrid duplication schemes that support modulation of ELR wireless packets.

FIG. 15 shows an example hybrid duplication scheme 1500 that supports modulation of ELR wireless packets. In some examples, the hybrid duplication scheme 1500 may implement or be implemented by aspects of the wireless communication network 100, the PDU 200, the PPDU 300, the frequency diagram 400, the signaling diagram 500 or any combination thereof as described with reference to FIGS. 1-5. For example, the hybrid duplication scheme 1500 may be implemented by a wireless device such as a STA, which may be an example of the STA 104 as described with reference to FIG. 1 and/or FIG. 5.

The wireless device may duplicate symbols for a packet, such as an ELR wireless packet 505 described with reference to FIG. 5, according to two or more duplication schemes such that the packet includes duplications of one or more portions, such as a data portion 510 described with reference to FIG. 5. In other words, the wireless device may produce duplications of one or more portions of a packet in accordance with a hybrid duplication scheme. The one or more portions may include a data portion or a SIG field (such as an ELR-SIG field or a UHR-ELR-SIG field) portion, or both.

The wireless device may generate a signal by applying a coded-bit duplication followed by a time domain duplication. For example, in a first step 1505, the wireless device may apply the coded-bit duplication for 2× duplication and the time domain duplication for an additional 2× duplication. The coded-bit duplication may include duplicating (such as repeating) LDPC encoded bits via a repetition coding procedure to produce a 2× duplication (such as 2×DUP in the coded bit domain).

In a second step 1510, the wireless device may apply the time domain duplication. For example, in a first option for the second step 1510-a, the wireless device may, after applying the coded-bit duplication, directly duplicate the packet in the time domain to produce the 2× duplication. Or, in a second option for the second step 1510-b, the wireless device may allocate a modulated symbol on alternating tones (such as every other tone) to generate the 2× duplication.

Figure 16:
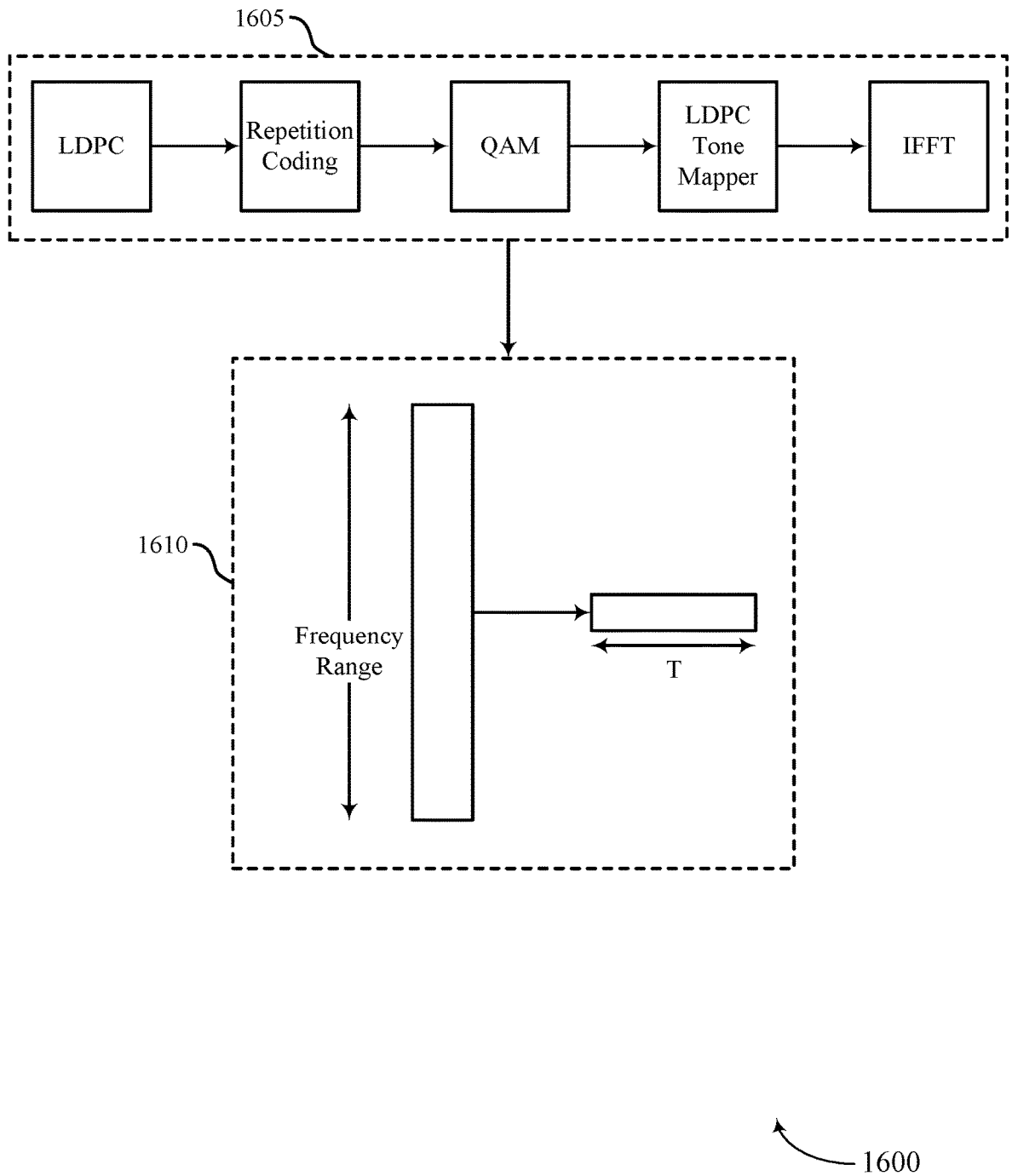

FIG. 16 shows an example hybrid duplication scheme 1600 that supports modulation of ELR wireless packets. In some examples, the hybrid duplication scheme 1600 may implement or be implemented by aspects of the wireless communication network 100, the PDU 200, the PPDU 300, the frequency diagram 400, the signaling diagram 500 or any combination thereof as described with reference to FIGS. 1-5. For example, the hybrid duplication scheme 1600 may be implemented by a wireless device such as a STA, which may be an example of the STA 104 as described with reference to FIG. 1 and/or FIG. 5.

The wireless device may duplicate symbols for a packet, such as an ELR wireless packet 505 described with reference to FIG. 5, according to two or more duplication schemes such that the packet includes duplications of one or more portions, such as a data portion 510 described with reference to FIG. 5. In other words, the wireless device may produce duplications of one or more portions of a packet in accordance with a hybrid duplication scheme. The one or more portions may include a data portion or a SIG field (such as an ELR-SIG field or a UHR-ELR-SIG field) portion, or both.

The wireless device may generate a signal by applying a coded-bit duplication followed by a frequency domain duplication. For example, in a first step 1605, the wireless device may apply the coded-bit duplication for 2× duplication and the frequency domain duplication for an additional 2× duplication. The coded-bit duplication may include duplicating (such as repeating) LDPC encoded bits via a repetition coding procedure to produce a 2× duplication.

In a second step 1610, the wireless device may apply the frequency domain duplication. The frequency domain duplication may include applying a modulation in accordance with an MCS, such as MCS15, to a set of tones to be duplicated over a set of resources, such as 242 resource units and/or spanning a frequency range, for example, of 20 MHz and/or 256-pt FFT size. The wireless device may, after producing the duplication in the frequency domain, perform an IFFT to convert the set of tones to a time domain.

Additionally, or alternatively, the frequency domain duplication may include applying a modulation in accordance with an MCS, such as MCS15, to a set of tones to be duplicated over a set of resources, such as 52 tones or 56 tones in a 1 symbol duration (64-pt. FFT with 20 MHz). In other words, for hybrid repetition coding plus 2× frequency domain duplication, frequency domain duplication can be also based on using MCS15 on 52 tones or 56 tones in a 1 symbol duration (64-pt. FFT with 20 MHz).

Figure 17:
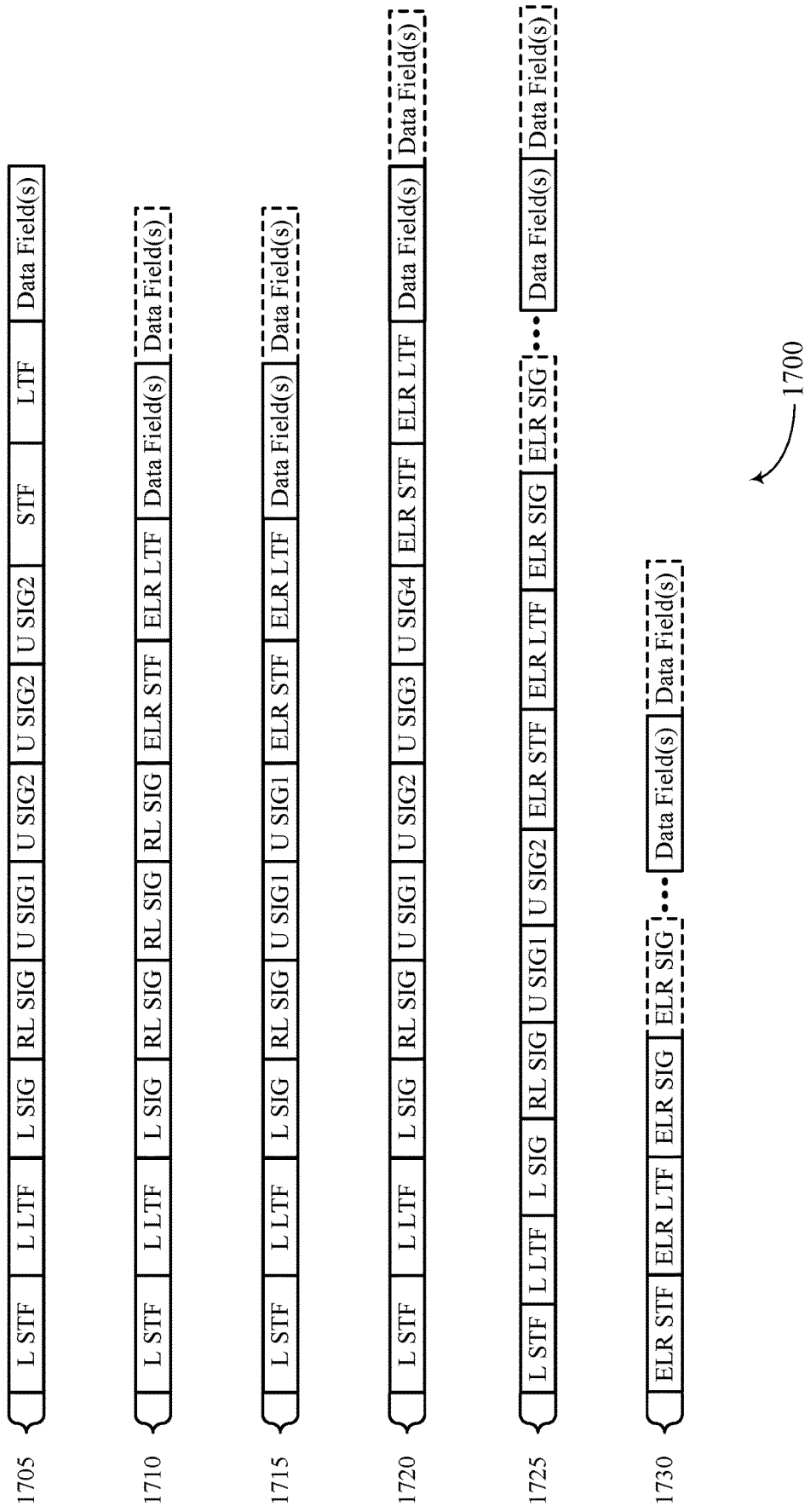
FIG. 17 shows an example of packet formats that support modulation of ELR wireless packets.

FIG. 17 shows example packet formats 1700 that support modulation of ELR wireless packets. In some examples, the packet formats 1700 may implement or be implemented by aspects of the wireless communication network 100, the PDU 200, the PPDU 300, the frequency diagram 400, the signaling diagram 500 or any combination thereof as described with reference to FIGS. 1-5. For example, the packet formats 1700 may be implemented by a wireless device such as a STA, which may be an example of the STA 104 as described with reference to FIG. 1 and/or FIG. 5.

The wireless device may transmit a packet having one or more portions duplicated according to a duplication scheme, such as the duplication schemes and/or hybrid duplication schemes as described with reference to any one or more of FIGS. 6-9 and 11-16.

For example, the wireless device may transmit a packet having a packet format 1705, which may be referred to as a mixed mode ER SU. The packet format 1705 may include duplications to a SIG portion of the packet. Additionally, or alternatively, the wireless device may transmit the packet having a packet format 1710, which may be referred to as a mixed mode L-SIG 4× duplication packet format. The packet format 1710 may include a 4× duplication with a 1× symbol duration to a SIG portion (such as with repeated guard intervals for each duplication as described with reference to FIG. 8) and a 4× duplication to a data portion of the packet and/or a dRU.

The wireless device may transmit the packet having the packet format 1715, which may be referred to as a mixed mode U-SIG 2× duplication MCS15 packet format. The packet format 1715 may include a 4× duplication to the data portion of the packet and/or a dRU. Additionally, or alternatively, the packet format 1715 may include a U-SIG modulated via an MCS, such as MCS15, as well as a repetition to the U-SIG, which may be referred to as an RU-SIG.

The wireless device may transmit the packet having the packet format 1720, which may be referred to as a mixed mode ELR-SIG with 4× duplication. The packet format 1720 may include a 4× duplication to the SIG portion of the packet. For example, the wireless device may produce the 4× duplication to the SIG portion via a time domain duplication scheme, MCS14 (such as with 1× symbol), a coded-bit duplication scheme, or a 2× duplication via a time domain duplication scheme and MCS15. Additionally, or alternatively, the packet format 1720 may include a 4× duplication to the data portion of the packet and/or a dRU.

The wireless device may transmit the packet having the packet format 1725, which may be referred to as spoofing in combination with a greenfield format. The packet format 1725 may include a second set of portions of the packet which correspond to portions included in a greenfield format. Prior to the second set of portions, the packet format 1725 may include (such as be prepended with) a first set of portions. The first set of portions, in some implementations may include a U-SIG and/or a duplication (such as a 2× duplication) of the U-SIG.

The wireless device may transmit the packet having the packet format 1730, which may be referred to as an ELR greenfield (GF) packet format. The packet format 1730 may be the same format represented by and described with respect to the first ELR wireless packet 505-*a* of FIG. 5. The packet format 1730 may include a 4× duplication to the data portion and ELR-SIG of the packet and/or a dRU.

Figure 18:
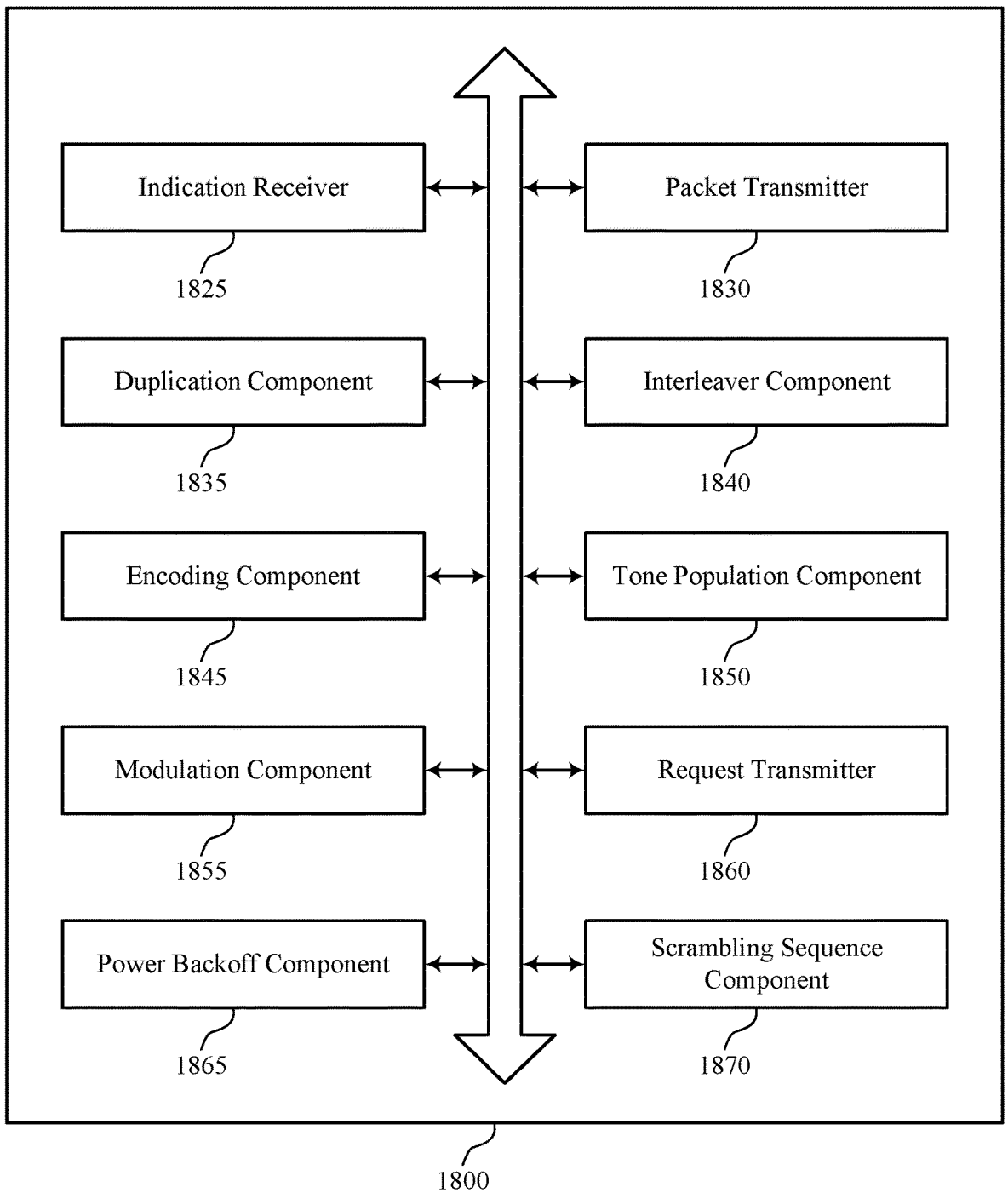
FIGS. 18 and 19 show block diagrams of example wireless communication devices that support modulation of ELR wireless packets.

FIG. 18 shows a block diagram of an example wireless communication device 1800 that supports modulation of ELR wireless packets. In some examples, the wireless communication device 1800 is configured to perform the processes 2000 and 2100 described with reference to FIGS. 20 and 21, respectively. The wireless communication device 1800 may include one or more chips, SoCs, chipsets, packages, components or devices that individually or collectively constitute or include a processing system. The processing system may interface with other components of the wireless communication device 1800, and may generally process information (such as inputs or signals) received from such other components and output information (such as outputs or signals) to such other components. In some aspects, an example chip may include a processing system, a first interface to output or transmit information and a second interface to receive or obtain information. For example, the first interface may refer to an interface between the processing system of the chip and a transmission component, such that the wireless communication device 1800 may transmit the information output from the chip. In such an example, the second interface may refer to an interface between the processing system of the chip and a reception component, such that the wireless communication device 1800 may receive information that is then passed to the processing system. In some such examples, the first interface also may obtain information, such as from the transmission component, and the second interface also may output information, such as to the reception component.

The processing system of the wireless communication device 1800 includes processor (or "processing") circuitry in the form of one or multiple processors, microprocessors, processing units (such as central processing units (CPUs), graphics processing units (GPUs) or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. The processing system may further include memory circuitry in the form of one or more memory devices, memory blocks, memory elements or other discrete gate or transistor logic or circuitry, each of which may include tangible storage media such as random-access memory (RAM) or ROM, or combinations thereof (all of which may be generally referred to herein individually as "memories" or collectively as "the memory" or "the memory circuitry"). One or more of the memories may be coupled with one or more of the processors and may individually or collectively store processor-executable code that, when executed by one or more of the processors, may configure one or more of the processors to perform various functions or operations described herein. Additionally, or alternatively, in some examples, one or more of the processors may be preconfigured to perform various functions or operations described herein without requiring configuration by software. The processing system may further include or be coupled with one or more modems (such as a Wi-Fi (such as IEEE compliant) modem or a cellular (such as 3GPP 4G LTE, 5G or 6G compliant) modem). In some implementations, one or more processors of the processing system include or implement one or more of the modems. The processing system may further include or be coupled with multiple radios (collectively "the radio"), multiple RF chains or multiple transceivers, each of which may in turn be coupled with one or more of multiple antennas. In some implementations, one or more processors of the processing system include or implement one or more of the radios, RF chains or transceivers.

In some examples, the wireless communication device 1800 can configurable or configured for use in a STA, such as the STA 104 described with reference to FIG. 1. In some other examples, the wireless communication device 1800 can be a STA that includes such a processing system and other components including multiple antennas. The wireless communication device 1800 is capable of transmitting and receiving wireless communications in the form of, for example, wireless packets. For example, the wireless communication device 1800 can be configurable or configured to transmit and receive packets in the form of physical layer PPDUs and MPDUs conforming to one or more of the IEEE 802.11 family of wireless communication protocol standards. In some other examples, the wireless communication device 1800 can be configurable or configured to transmit and receive signals and communications conforming to one or more 3GPP specifications including those for 5G NR or 6G. In some examples, the wireless communication device 1800 also includes or can be coupled with one or more application processors which may be further coupled with one or more other memories. In some examples, the wireless communication device 1800 further includes a user interface (UI) (such as a touchscreen or keypad) and a display, which may be integrated with the UI to form a touchscreen display that is coupled with the processing system. In some examples, the wireless communication device 1800 may further include one or more sensors such as, for example, one or more inertial sensors, accelerometers, temperature sensors, pressure sensors, or altitude sensors, that are coupled with the processing system.

The wireless communication device 1800 includes an indication receiver 1825, a packet transmitter 1830, a duplication component 1835, an interleaver component 1840, an encoding component 1845, a tone population component 1850, a modulation component 1855, a request transmitter 1860, a power backoff component 1865, and a scrambling sequence component 1870. Portions of one or more of the indication receiver 1825, the packet transmitter 1830, the duplication component 1835, the interleaver component 1840, the encoding component 1845, the tone population component 1850, the modulation component 1855, the request transmitter 1860, the power backoff component 1865, and the scrambling sequence component 1870 may be implemented at least in part in hardware or firmware. For example, one or more of the indication receiver 1825, the packet transmitter 1830, the duplication component 1835, the interleaver component 1840, the encoding component 1845, the tone population component 1850, the modulation component 1855, the request transmitter 1860, the power backoff component 1865, and the scrambling sequence component 1870 may be implemented at least in part by at least a processor or a modem. In some examples, portions of one or more of the indication receiver 1825, the packet transmitter 1830, the duplication component 1835, the interleaver component 1840, the encoding component 1845, the tone population component 1850, the modulation component 1855, the request transmitter 1860, the power backoff component 1865, and the scrambling sequence component 1870 may be implemented at least in part by a processor and software in the form of processor-executable code stored in memory.

The wireless communication device 1800 may support wireless communications in accordance with examples as disclosed herein. The indication receiver 1825 is configurable or configured to receive an indication to transmit a single-user wireless packet associated with an extended long range communication mode, where the single-user wireless packet includes a preamble portion and a data portion, and where at least the data portion is associated with a duplication scheme pertaining to the extended long range communication mode. The packet transmitter 1830 is configurable or configured to transmit, in accordance with the indication, the single-user wireless packet using a first quantity of duplications of at least the data portion in accordance with the duplication scheme, where the first quantity of duplications is associated with the extended long range communication mode.

In some examples, the duplication component 1835 is configurable or configured to produce the first quantity of duplications of at least the data portion according to a blockwise repetition procedure. In some examples, the interleaver component 1840 is configurable or configured to apply a binary convolutional coding (BCC) interleaver, a low-density parity check (LDPC) tone mapper, or both to the data portion.

In some examples, the scrambling sequence component 1870 is configurable or configured to apply a scrambling sequence to the first quantity of duplications of at least the data portion prior to applying the BCC interleaver, the LDPC tone mapper, or both to the data portion.

In some examples, the encoding component 1845 is configurable or configured to encode the data portion according to a low-density parity check (LDPC) coding scheme, where the LDPC coding scheme is associated with an outer coding of the data portion. In some examples, the encoding component 1845 is configurable or configured to encode LDPC coded bits (as produced by encoding the data portion according to the LDPC coding scheme) of the data portion according to a repetition coding scheme, where the repetition coding scheme is associated with an inner coding of the data portion. In some examples, the duplication component 1835 is configurable or configured to produce the first quantity of duplications of at least the data portion in accordance with concatenating the LDPC coding scheme with the repetition coding scheme and repeating LDPC encoded bits by the first quantity.

In some examples, the duplication component 1835 is configurable or configured to duplicate a set of multiple symbols of the data portion in a time domain to produce the first quantity of duplications, the single-user wireless packet including a quantity of guard intervals in the time domain corresponding to the first quantity of duplications.

In some examples, the tone population component 1850 is configurable or configured to populate a subset of tones in a frequency domain in accordance with the first quantity of duplications. In some examples, the duplication component 1835 is configurable or configured to produce the first quantity of duplications in accordance with transforming a frequency domain signal associated with the subset of tones to a time domain signal associated with a set of multiple symbols, where the set of multiple symbols are associated with the first quantity of duplications, and where the single-user wireless packet includes a guard interval prior to the set of multiple symbols.

In some examples, the guard interval include a short guard interval of less than one microsecond.

In some examples, a quantity of the subset of tones be based on a resource unit size.

In some examples, to support populating the subset of tones, the tone population component 1850 is configurable or configured to populate every fourth tone in a frequency domain resource allocation associated with a 4× symbol.

In some examples, the modulation component 1855 is configurable or configured to modulate at least the data portion of the single-user wireless packet according to a first modulation and coding scheme (MCS) and a first resource allocation, the first resource allocation being associated with the first quantity of duplications.

In some examples, the first MCS be MCS14 or MCS15 and the first resource allocation includes 26 tones, the first quantity of duplications being extremely high throughout (EHT) duplications.

In some examples, the first MCS be MCS14 and the first resource allocation is a quantity of duplications of a resource unit including 52 tones, the quantity of duplications of the resource unit including 52 tones corresponding to the first quantity of duplications.

In some examples, the first MCS be MCS15 and the first resource allocation is a quantity of duplications of a first resource unit including 106 tones, the quantity of duplications of the first resource unit including 106 tones corresponding to half of the first quantity of duplications.

In some examples, the duplication scheme include a coded-bit duplication scheme, a time domain duplication scheme, a frequency domain duplication scheme, or any combination thereof.

In some examples, the first quantity of duplications include a first subset of duplications in accordance with the frequency domain duplication scheme and a second subset of duplications in accordance with the time domain duplication scheme.

In some examples, the first quantity of duplications include a first subset of duplications in accordance with the coded-bit duplication scheme and a second subset of duplications in accordance with the time domain duplication scheme.

In some examples, the first quantity of duplications include a first subset of duplications in accordance with the coded-bit duplication scheme and a second subset of duplications in accordance with the frequency domain duplication scheme.

In some examples, to support transmitting the single-user wireless packet, the packet transmitter 1830 is configurable or configured to transmit the single-user wireless packet using the first quantity of duplications of at least the data portion and a signal (SIG) field of the single-user wireless packet in accordance with the duplication scheme, where the SIG field of the single-user wireless packet is associated with the extended long range communication mode.

In some examples, the request transmitter 1860 is configurable or configured to transmit a request to transmit the single-user wireless packet, where receiving the indication to transmit the single-user wireless packet is based on the request.

In some examples, the single-user wireless packet be associated with a single-user physical layer protocol data unit (PPDU) format.

Additionally, or alternatively, the wireless communication device 1800 may support wireless communications in accordance with examples as disclosed herein. In some examples, the indication receiver 1825 is configurable or configured to receive an indication of a resource allocation via which to transmit a single-user wireless packet associated with an extended long range communication mode, where the resource allocation is associated with a distributed resource unit including 52 tones and a first frequency range. In some examples, the packet transmitter 1830 is configurable or configured to transmit the single-user wireless packet in accordance with the resource allocation, where the resource allocation is associated with the extended long range communication mode.

In some examples, the power backoff component 1865 is configurable or configured to apply a power backoff in accordance with the resource allocation, where the resource allocation being associated with the distributed resource unit including 52 tones and the extended long range communication mode triggers an application of the power backoff. In some examples, the packet transmitter 1830 is configurable or configured to transmit the single-user wireless packet in accordance with the power backoff.

In some examples, the first frequency range be 20 megahertz (MHz).

In some examples, the single-user wireless packet be associated with power boosting, range extension, or both relative to other wireless packet transmissions by the wireless communication device.

Figure 19:
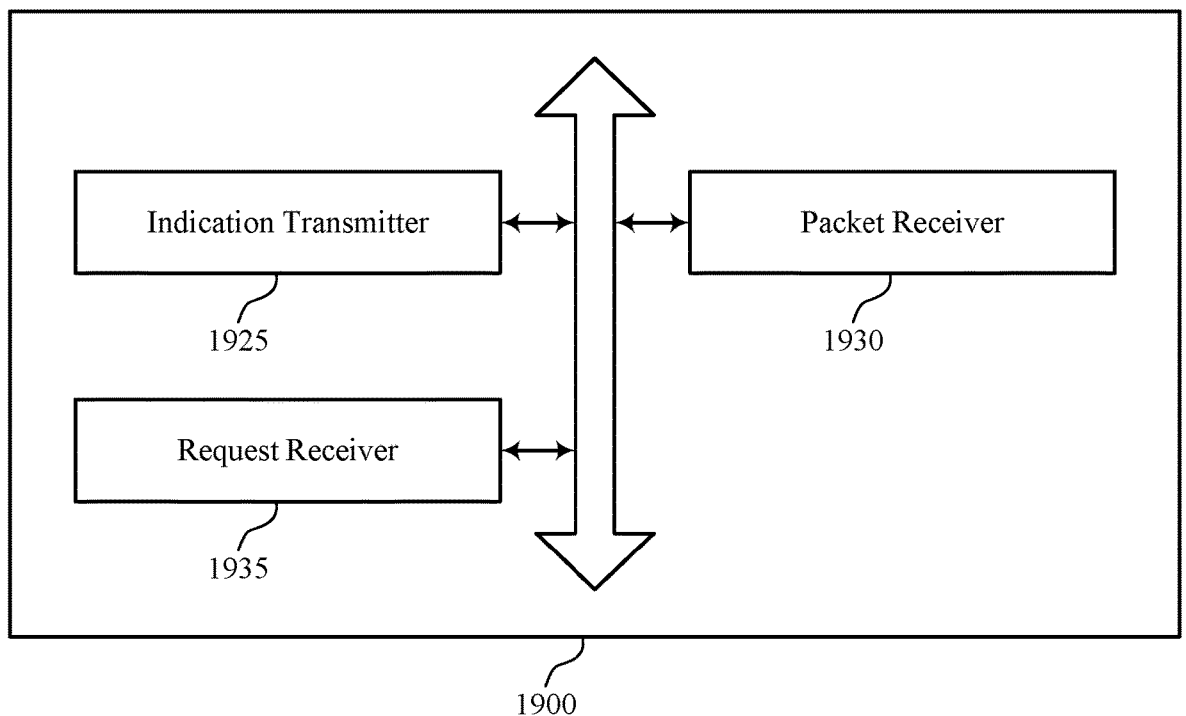

FIG. 19 shows a block diagram of an example wireless communication device 1900 that supports modulation of ELR wireless packets. In some examples, the wireless communication device 1900 is configured to perform the processes 2200 and 2300 described with reference to FIGS. 22 and 23, respectively. The wireless communication device 1900 may include one or more chips, SoCs, chipsets, packages, components or devices that individually or collectively constitute or include a processing system. The processing system may interface with other components of the wireless communication device 1900, and may generally process information (such as inputs or signals) received from such other components and output information (such as outputs or signals) to such other components. In some aspects, an example chip may include a processing system, a first interface to output or transmit information and a second interface to receive or obtain information. For example, the first interface may refer to an interface between the processing system of the chip and a transmission component, such that the wireless communication device 1900 may transmit the information output from the chip. In such an example, the second interface may refer to an interface between the processing system of the chip and a reception component, such that the wireless communication device 1900 may receive information that is then passed to the processing system. In some such examples, the first interface also may obtain information, such as from the transmission component, and the second interface also may output information, such as to the reception component.

The processing system of the wireless communication device 1900 includes processor (or "processing") circuitry in the form of one or multiple processors, microprocessors, processing units (such as central processing units (CPUs), graphics processing units (GPUs) or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. The processing system may further include memory circuitry in the form of one or more memory devices, memory blocks, memory elements or other discrete gate or transistor logic or circuitry, each of which may include tangible storage media such as random-access memory (RAM) or ROM, or combinations thereof (all of which may be generally referred to herein individually as "memories" or collectively as "the memory" or "the memory circuitry"). One or more of the memories may be coupled with one or more of the processors and may individually or collectively store processor-executable code that, when executed by one or more of the processors, may configure one or more of the processors to perform various functions or operations described herein. Additionally, or alternatively, in some examples, one or more of the processors may be preconfigured to perform various functions or operations described herein without requiring configuration by software. The processing system may further include or be coupled with one or more modems (such as a Wi-Fi (such as IEEE compliant) modem or a cellular (such as 3GPP 4G LTE, 5G or 6G compliant) modem). In some implementations, one or more processors of the processing system include or implement one or more of the modems. The processing system may further include or be coupled with multiple radios (collectively "the radio"), multiple RF chains or multiple transceivers, each of which may in turn be coupled with one or more of multiple antennas. In some implementations, one or more processors of the processing system include or implement one or more of the radios, RF chains or transceivers.

In some examples, the wireless communication device 1900 can configurable or configured for use in an AP, such as the AP 102 described with reference to FIG. 1. In some other examples, the wireless communication device 1900 can be an AP that includes such a processing system and other components including multiple antennas. The wireless communication device 1900 is capable of transmitting and receiving wireless communications in the form of, for example, wireless packets. For example, the wireless communication device 1900 can be configurable or configured to transmit and receive packets in the form of physical layer PPDUs and MPDUs conforming to one or more of the IEEE 802.11 family of wireless communication protocol standards. In some other examples, the wireless communication device 1900 can be configurable or configured to transmit and receive signals and communications conforming to one or more 3GPP specifications including those for 5G NR or 6G. In some examples, the wireless communication device 1900 also includes or can be coupled with one or more application processors which may be further coupled with one or more other memories. In some examples, the wireless communication device 1900 further includes at least one external network interface coupled with the processing system that enables communication with a core network or backhaul network that enables the wireless communication device 1900 to gain access to external networks including the Internet.

The wireless communication device 1900 includes an indication transmitter 1925, a packet receiver 1930, and a request receiver 1935. Portions of one or more of the indication transmitter 1925, the packet receiver 1930, and the request receiver 1935 may be implemented at least in part in hardware or firmware. For example, one or more of the indication transmitter 1925, the packet receiver 1930, and the request receiver 1935 may be implemented at least in part by at least a processor or a modem. In some examples, portions of one or more of the indication transmitter 1925, the packet receiver 1930, and the request receiver 1935 may be implemented at least in part by a processor and software in the form of processor-executable code stored in memory.

The wireless communication device 1900 may support wireless communications in accordance with examples as disclosed herein. The indication transmitter 1925 is configurable or configured to transmit an indication to transmit a single-user wireless packet associated with an extended long range communication mode, where the single-user wireless packet includes a preamble portion and a data portion, and where at least the data portion is associated with a duplication scheme pertaining to the extended long range communication mode. The packet receiver 1930 is configurable or configured to receive, in accordance with the indication, the single-user wireless packet using a first quantity of duplications of at least the data portion in accordance with the duplication scheme, where the first quantity of duplications is associated with the extended long range communication mode.

In some examples, to support receiving the single-user wireless packet, the packet receiver 1930 is configurable or configured to receive the single-user wireless packet using the first quantity of duplications of at least the data portion and a signal (SIG) field of the single-user wireless packet in accordance with the duplication scheme, where the SIG field of the single-user wireless packet is associated with the extended long range communication mode.

In some examples, the request receiver 1935 is configurable or configured to receive a request to transmit the single-user wireless packet, where receiving the indication to transmit the single-user wireless packet is based on the request.

In some examples, the single-user wireless packet be associated with a single-user physical layer protocol data unit (PPDU) format.

Additionally, or alternatively, the wireless communication device 1900 may support wireless communications in accordance with examples as disclosed herein. In some examples, the indication transmitter 1925 is configurable or configured to receive an indication of a resource allocation via which to transmit a single-user wireless packet associated with an extended long range communication mode, where the resource allocation is associated with a distributed resource unit including 52 tones and a first frequency range. In some examples, the packet receiver 1930 is configurable or configured to transmit the single-user wireless packet in accordance with the resource allocation, where the resource allocation is associated with the extended long range communication mode.

In some examples, the packet receiver 1930 is configurable or configured to receive the single-user wireless packet in accordance with a power backoff.

In some examples, the first frequency range be 20 megahertz (MHz).

In some examples, the single-user wireless packet be associated with power boosting, range extension, or both relative to other wireless packet transmissions by the wireless communication device.

Figure 20:
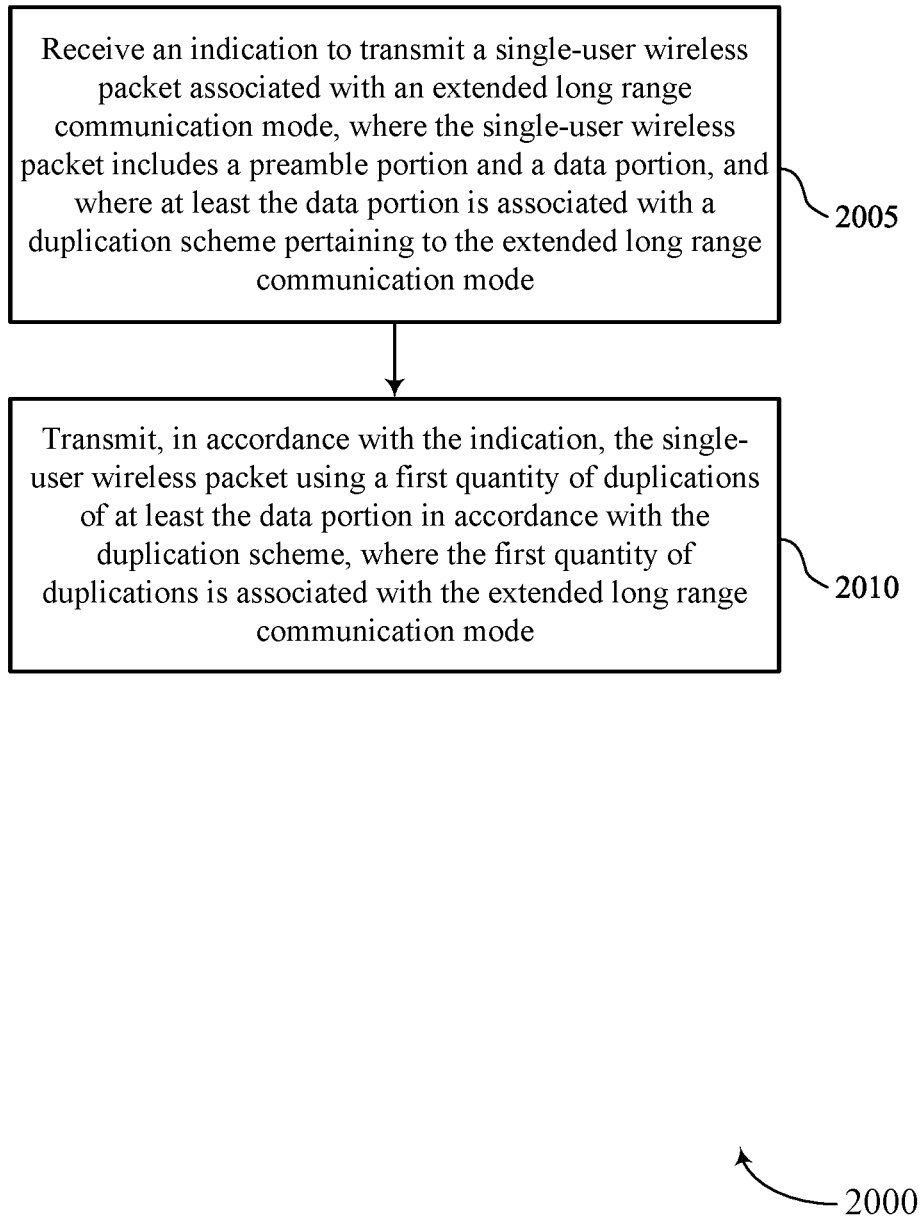
FIGS. 20-23 show flowcharts illustrating example processes performable by or at a wireless communication device that supports modulation of ELR wireless packets.

FIG. 20 shows a flowchart illustrating an example process 2000 performable by or at a wireless communication device that supports modulation of ELR wireless packets. The operations of the process 2000 may be implemented by a wireless communication device or its components as described herein. For example, the process 2000 may be performed by a wireless communication device, such as the wireless communication device 1800 described with reference to FIG. 18, operating as or within a wireless STA. In some examples, the process 2000 may be performed by a wireless STA, such as one of the STAs 104 described with reference to FIG. 1.

In some examples, in block 2005, the wireless communication device may receive an indication to transmit a single-user wireless packet associated with an extended long range communication mode, where the single-user wireless packet includes a preamble portion and a data portion, and where at least the data portion is associated with a duplication scheme pertaining to the extended long range communication mode. The operations of block 2005 may be performed in accordance with examples as disclosed herein. In some implementations, aspects of the operations of block 2005 may be performed by an indication receiver 1825 as described with reference to FIG. 18.

In some examples, in block 2010, the wireless communication device may transmit, in accordance with the indication, the single-user wireless packet using a first quantity of duplications of at least the data portion in accordance with the duplication scheme, where the first quantity of duplications is associated with the extended long range communication mode. The operations of block 2010 may be performed in accordance with examples as disclosed herein. In some implementations, aspects of the operations of block 2010 may be performed by a packet transmitter 1830 as described with reference to FIG. 18.

Figure 21:
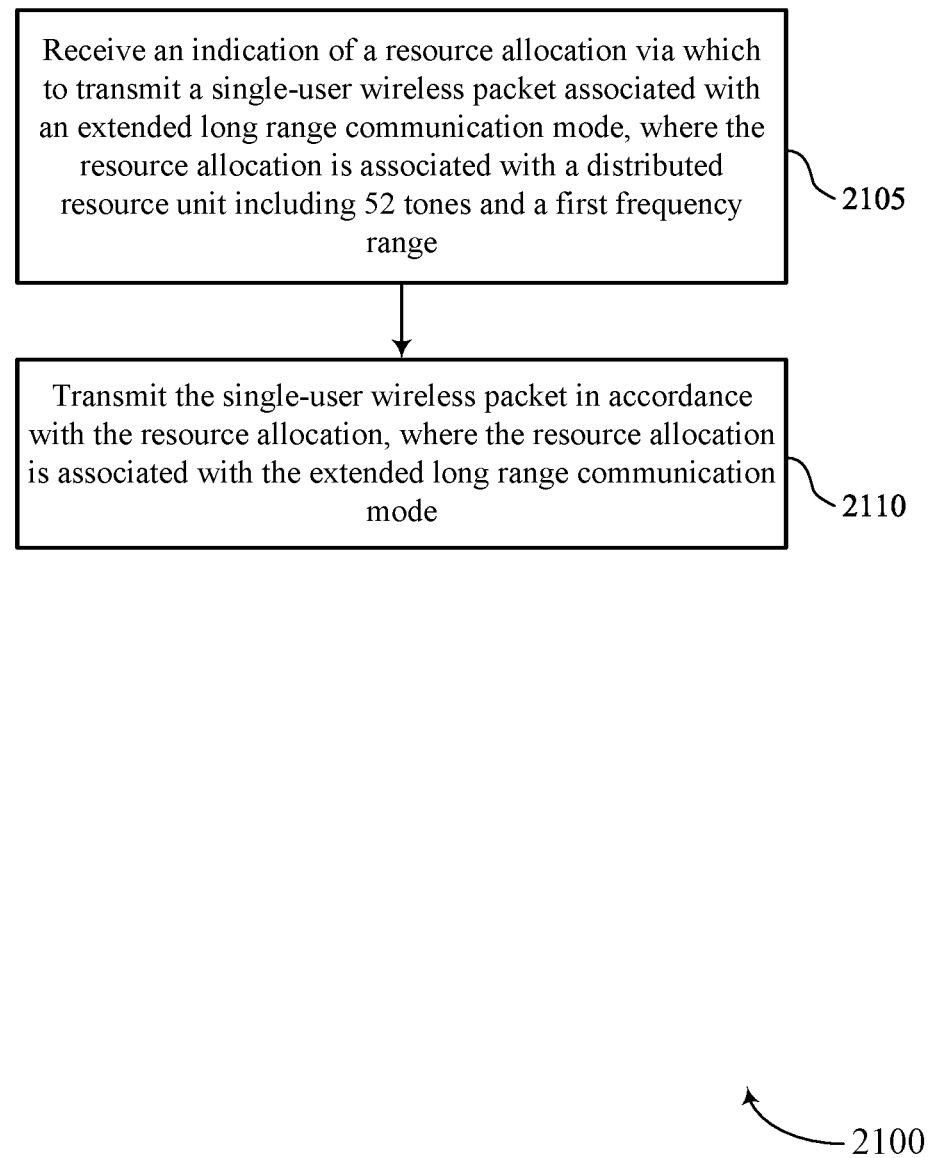

FIG. 21 shows a flowchart illustrating an example process 2100 performable by or at a wireless communication device that supports modulation of ELR wireless packets. The operations of the process 2100 may be implemented by a wireless communication device or its components as described herein. For example, the process 2100 may be performed by a wireless communication device, such as the wireless communication device 1800 described with reference to FIG. 18, operating as or within a wireless STA. In some examples, the process 2100 may be performed by a wireless STA, such as one of the STAs 104 described with reference to FIG. 1.

In some examples, in block 2105, the wireless communication device may receive an indication of a resource allocation via which to transmit a single-user wireless packet associated with an extended long range communication mode, where the resource allocation is associated with a distributed resource unit including 52 tones and a first frequency range. The operations of block 2105 may be performed in accordance with examples as disclosed herein. In some implementations, aspects of the operations of block 2105 may be performed by an indication receiver 1825 as described with reference to FIG. 18.

In some examples, in block 2110, the wireless communication device may transmit the single-user wireless packet in accordance with the resource allocation, where the resource allocation is associated with the extended long range communication mode. The operations of block 2110 may be performed in accordance with examples as disclosed herein. In some implementations, aspects of the operations of block 2110 may be performed by a packet transmitter 1830 as described with reference to FIG. 18.

Figure 22:
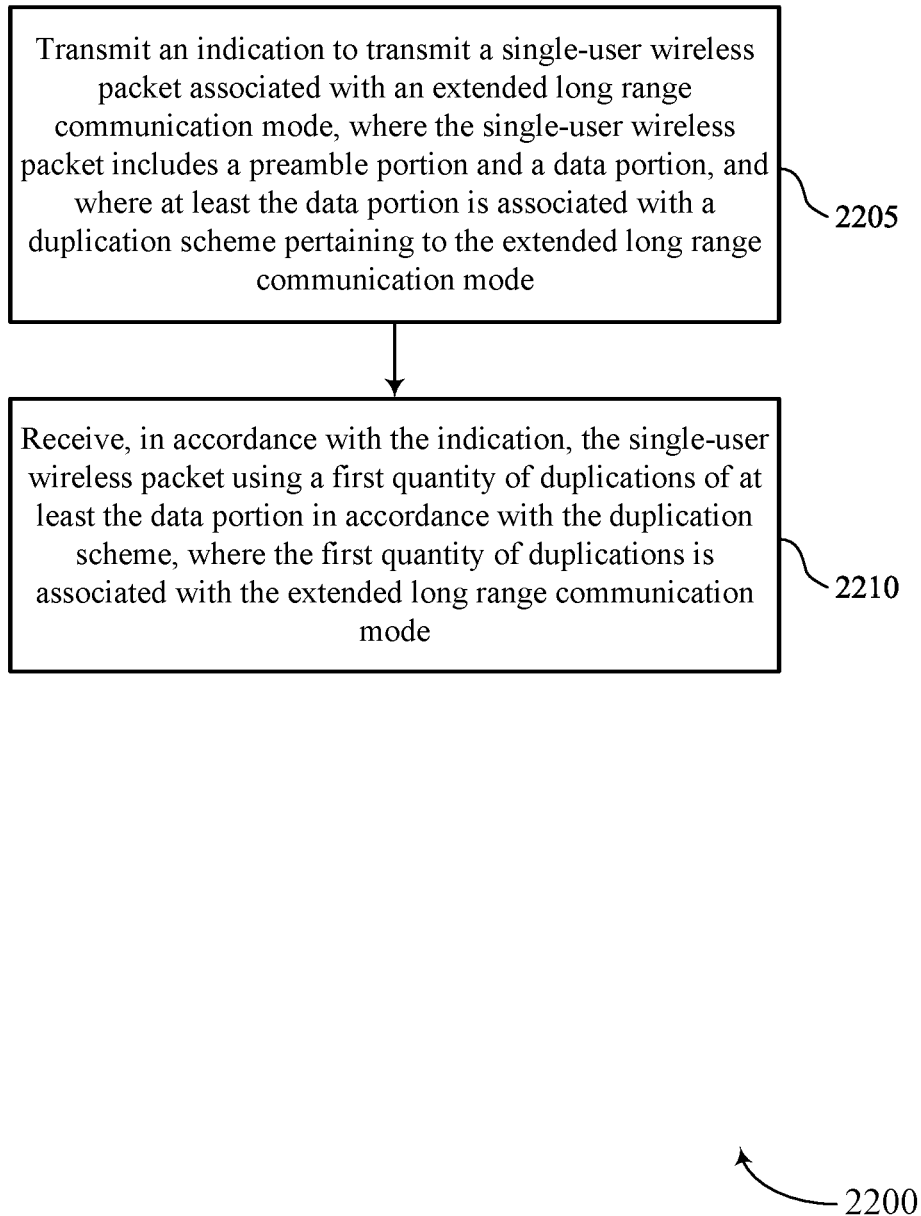

FIG. 22 shows a flowchart illustrating an example process 2200 performable by or at a wireless communication device that supports modulation of ELR wireless packets. The operations of the process 2200 may be implemented by a wireless communication device or its components as described herein. For example, the process 2200 may be performed by a wireless communication device, such as the wireless communication device 1900 described with reference to FIG. 19, operating as or within a wireless AP. In some examples, the process 2200 may be performed by a wireless AP, such as one of the APs 102 described with reference to FIG. 1.

In some examples, in block 2205, the wireless communication device may transmit an indication to transmit a single-user wireless packet associated with an extended long range communication mode, where the single-user wireless packet includes a preamble portion and a data portion, and where at least the data portion is associated with a duplication scheme pertaining to the extended long range communication mode. The operations of block 2205 may be performed in accordance with examples as disclosed herein. In some implementations, aspects of the operations of block 2205 may be performed by an indication transmitter 1925 as described with reference to FIG. 19.

In some examples, in block 2210, the wireless communication device may receive, in accordance with the indication, the single-user wireless packet using a first quantity of duplications of at least the data portion in accordance with the duplication scheme, where the first quantity of duplications is associated with the extended long range communication mode. The operations of block 2210 may be performed in accordance with examples as disclosed herein. In some implementations, aspects of the operations of block 2210 may be performed by a packet receiver 1930 as described with reference to FIG. 19.

Figure 23:
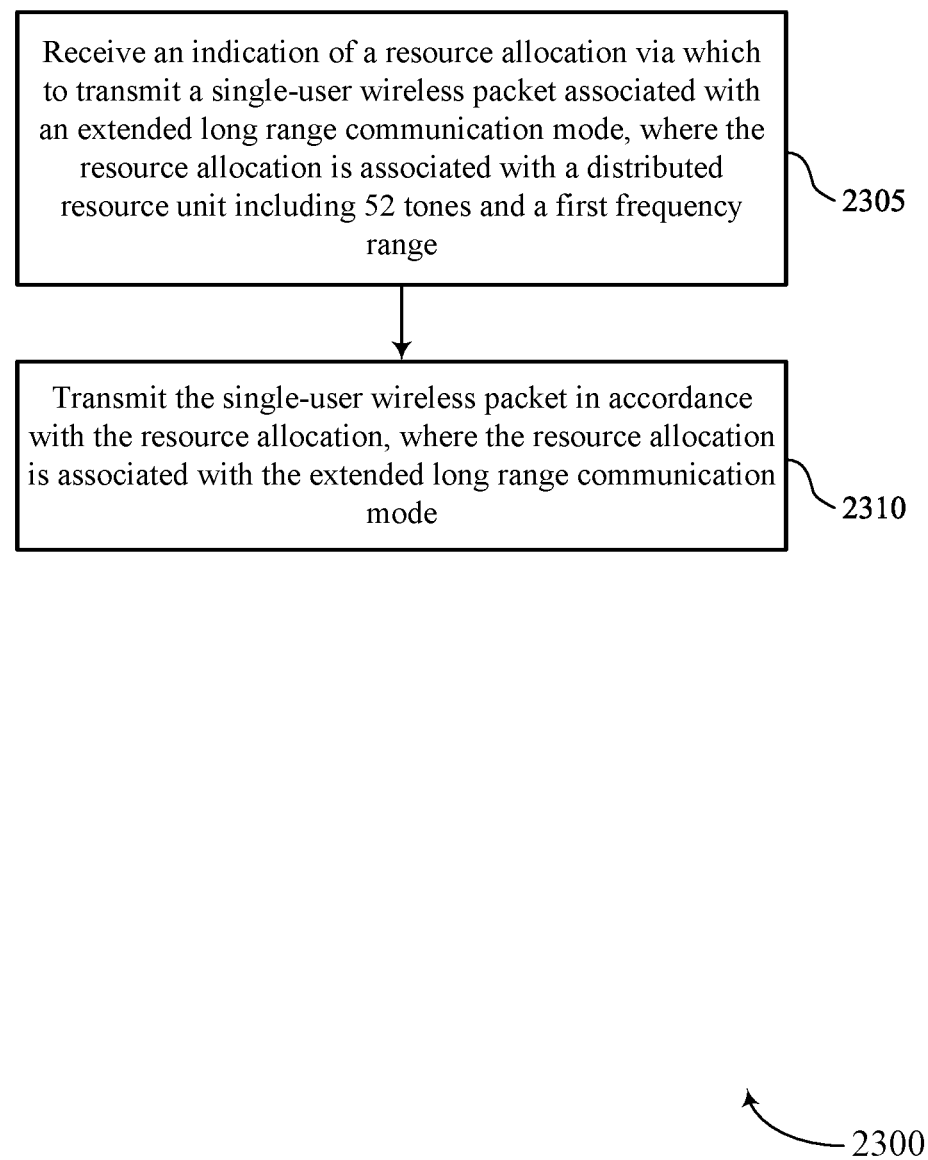

FIG. 23 shows a flowchart illustrating an example process 2300 performable by or at a wireless communication device that supports modulation of ELR wireless packets. The operations of the process 2300 may be implemented by a wireless communication device or its components as described herein. For example, the process 2300 may be performed by a wireless communication device, such as the wireless communication device 1900 described with reference to FIG. 19, operating as or within a wireless AP. In some examples, the process 2300 may be performed by a wireless AP, such as one of the APs 102 described with reference to FIG. 1.

In some examples, in block 2305, the wireless communication device may receive an indication of a resource allocation via which to transmit a single-user wireless packet associated with an extended long range communication mode, where the resource allocation is associated with a distributed resource unit including 52 tones and a first frequency range. The operations of block 2305 may be performed in accordance with examples as disclosed herein. In some implementations, aspects of the operations of block 2305 may be performed by an indication transmitter 1925 as described with reference to FIG. 19.

In some examples, in block 2310, the wireless communication device may transmit the single-user wireless packet in accordance with the resource allocation, where the resource allocation is associated with the extended long range communication mode. The operations of block 2310 may be performed in accordance with examples as disclosed herein. In some implementations, aspects of the operations of block 2310 may be performed by a packet receiver 1930 as described with reference to FIG. 19.

Implementation examples are described in the following numbered clauses:

Clause 1: A method for wireless communications at a wireless communication device, including: receiving an indication to transmit a single-user wireless packet associated with an ELR communication mode, where the single-user wireless packet includes a preamble portion and a data portion, and where at least the data portion is associated with a duplication scheme pertaining to the ELR communication mode; and transmitting, in accordance with the indication, the single-user wireless packet using a first quantity of duplications of at least the data portion in accordance with the duplication scheme, where the first quantity of duplications is associated with the ELR communication mode.

Clause 2: The method of clause 1, further including: producing the first quantity of duplications of at least the data portion according to a blockwise repetition procedure; and applying a BCC interleaver, a LDPC tone mapper, or both to the data portion.

Clause 3: The method of clause 2, further including: applying a scrambling sequence to the first quantity of duplications of at least the data portion prior to applying the BCC interleaver, the LDPC tone mapper, or both to the data portion.

Clause 4: The method of any of clauses 1-3, further including: encoding the data portion according to a repetition coding scheme, where the repetition coding scheme is associated with an inner coding of the data portion; encoding LDPC coded bits according to a LDPC coding scheme, where the LDPC coding scheme is associated with an outer coding of the data portion; and producing the first quantity of duplications of at least the data portion in accordance with concatenating the LDPC coding scheme with the repetition coding scheme and repeating LDPC encoded bits by the first quantity.

Clause 5: The method of any of clauses 1-4, further including: duplicating a plurality of symbols of the data portion in a time domain to produce the first quantity of duplications, the single-user wireless packet including a quantity of guard intervals in the time domain corresponding to the first quantity of duplications.

Clause 6: The method of any of clauses 1-5, further including: populating a subset of tones in a frequency domain in accordance with the first quantity of duplications; and producing the first quantity of duplications in accordance with transforming a frequency domain signal associated with the subset of tones to a time domain signal associated with a plurality of symbols, where the plurality of symbols are associated with the first quantity of duplications, and where the single-user wireless packet includes a guard interval prior to the plurality of symbols.

Clause 7: The method of clause 6, where the guard interval includes a short guard interval of less than one microsecond.

Clause 8: The method of any of clauses 6-7, where a quantity of the subset of tones is based at least in part on a resource unit size.

Clause 9: The method of any of clauses 6-8, where populating the subset of tones includes: populating every fourth tone in a frequency domain resource allocation associated with a 4× symbol.

Clause 10: The method of any of clauses 1-9, further including: modulating at least the data portion of the single-user wireless packet according to a first MCS and a first resource allocation, the first resource allocation being associated with the first quantity of duplications.

Clause 11: The method of clause 10, where the first MCS is MCS14 or MCS15 and the first resource allocation includes 26 tones, the first quantity of duplications being EHT duplications.

Clause 12: The method of any of clauses 10-11, where the first MCS is MCS14 and the first resource allocation is a quantity of duplications of a resource unit including 52 tones, the quantity of duplications of the resource unit including 52 tones corresponding to the first quantity of duplications.

Clause 13: The method of any of clauses 10-12, where the first MCS is MCS15 and the first resource allocation is a quantity of duplications of a first resource unit including 106 tones, the quantity of duplications of the first resource unit including 106 tones corresponding to half of the first quantity of duplications.

Clause 14: The method of any of clauses 1-13, where the duplication scheme includes a coded-bit duplication scheme, a time domain duplication scheme, a frequency domain duplication scheme, or any combination thereof.

Clause 15: The method of clause 14, where the first quantity of duplications includes a first subset of duplications in accordance with the frequency domain duplication scheme and a second subset of duplications in accordance with the time domain duplication scheme.

Clause 16: The method of any of clauses 14-15, where the first quantity of duplications includes a first subset of duplications in accordance with the coded-bit duplication scheme and a second subset of duplications in accordance with the time domain duplication scheme.

Clause 17: The method of any of clauses 14-16, where the first quantity of duplications includes a first subset of duplications in accordance with the coded-bit duplication scheme and a second subset of duplications in accordance with the frequency domain duplication scheme.

Clause 18: The method of any of clauses 1-17, where transmitting the single-user wireless packet includes: transmitting the single-user wireless packet using the first quantity of duplications of at least the data portion and a SIG field of the single-user wireless packet in accordance with the duplication scheme, where the SIG field of the single-user wireless packet is associated with the ELR communication mode.

Clause 19: The method of any of clauses 1-18, further including: transmitting a request to transmit the single-user wireless packet, where receiving the indication to transmit the single-user wireless packet is based at least in part on the request.

Clause 20: The method of any of clauses 1-19, where the single-user wireless packet is associated with a single-user PPDU format.

Clause 21: A method for wireless communications at a wireless communication device, including: receiving an indication of a resource allocation via which to transmit a single-user wireless packet associated with an ELR communication mode, where the resource allocation is associated with a distributed resource unit including 52 tones and a first frequency range; and transmitting the single-user wireless packet in accordance with the resource allocation, where the resource allocation is associated with the ELR communication mode.

Clause 22: The method of clause 21, further including: applying a power backoff in accordance with the resource allocation, where the resource allocation being associated with the distributed resource unit including 52 tones and the ELR communication mode triggers an application of the power backoff; and transmitting the single-user wireless packet in accordance with the power backoff.

Clause 23: The method of any of clauses 21-22, where the first frequency range is 20 MHz.

Clause 24: The method of any of clauses 21-23, where the single-user wireless packet is associated with power boosting, range extension, or both relative to other wireless packet transmissions by the wireless communication device.

Clause 25: A method for wireless communications at a wireless communication device, including: transmitting an indication to transmit a single-user wireless packet associated with an ELR communication mode, where the single-user wireless packet includes a preamble portion and a data portion, and where at least the data portion is associated with a duplication scheme pertaining to the ELR communication mode; and receiving, in accordance with the indication, the single-user wireless packet using a first quantity of duplications of at least the data portion in accordance with the duplication scheme, where the first quantity of duplications is associated with the ELR communication mode.

Clause 26: The method of clause 25, where receiving the single-user wireless packet includes: receiving the single-user wireless packet using the first quantity of duplications of at least the data portion and a SIG field of the single-user wireless packet in accordance with the duplication scheme, where the SIG field of the single-user wireless packet is associated with the ELR communication mode.

Clause 27: The method of any of clauses 25-26, further including: receiving a request to transmit the single-user wireless packet, where receiving the indication to transmit the single-user wireless packet is based at least in part on the request.

Clause 28: The method of any of clauses 25-27, where the single-user wireless packet is associated with a single-user physical layer protocol data unit (PPDU) format.

Clause 29: A method for wireless communications at a wireless communication device, including: receiving an indication of a resource allocation via which to transmit a single-user wireless packet associated with an ELR communication mode, where the resource allocation is associated with a distributed resource unit including 52 tones and a first frequency range; and transmitting the single-user wireless packet in accordance with the resource allocation, where the resource allocation is associated with the ELR communication mode.

Clause 30: The method of clause 29, further including: receiving the single-user wireless packet in accordance with a power backoff.

Clause 31: The method of any of clauses 29-30, where the first frequency range is 20 MHz.

Clause 32: The method of any of clauses 29-31, where the single-user wireless packet is associated with power boosting, range extension, or both relative to other wireless packet transmissions by the wireless communication device.

Clause 33: A wireless communication device, including one or more memories storing processor-executable code, and one or more processors coupled with the one or more memories and individually or collectively operable to execute the code to cause the wireless communication device to perform a method of any of clauses 1-20.

Clause 34: A wireless communication device, including a processing system that includes processor circuitry and memory circuitry that stores code, the processing system configured to cause the wireless communication device to perform a method of any of clauses 1-20.

Clause 35: A wireless communication device, including at least one means for performing a method of any of clauses 1-20.

Clause 36: A non-transitory computer-readable medium storing code for wireless communication, the code including instructions executable by one or more processors to perform a method of any of clauses 1-20.

Clause 37: A wireless communication device, including one or more memories storing processor-executable code, and one or more processors coupled with the one or more memories and individually or collectively operable to execute the code to cause the wireless communication device to perform a method of any of clauses 21-24.

Clause 38: A wireless communication device, including a processing system that includes processor circuitry and memory circuitry that stores code, the processing system configured to cause the wireless communication device to perform a method of any of clauses 21-24.

Clause 39: A wireless communication device, including at least one means for performing a method of any of clauses 21-24.

Clause 40: A non-transitory computer-readable medium storing code for wireless communication, the code including instructions executable by one or more processors to perform a method of any of clauses 21-24.

Clause 41: A wireless communication device, including one or more memories storing processor-executable code, and one or more processors coupled with the one or more memories and individually or collectively operable to execute the code to cause the wireless communication device to perform a method of any of clauses 25-28.

Clause 42: A wireless communication device, including a processing system that includes processor circuitry and memory circuitry that stores code, the processing system configured to cause the wireless communication device to perform a method of any of clauses 25-28.

Clause 43: A wireless communication device, including at least one means for performing a method of any of clauses 25-28.

Clause 44: A non-transitory computer-readable medium storing code for wireless communication, the code including instructions executable by one or more processors to perform a method of any of clauses 25-28.

Clause 45: A wireless communication device, including one or more memories storing processor-executable code, and one or more processors coupled with the one or more memories and individually or collectively operable to execute the code to cause the wireless communication device to perform a method of any of clauses 29-32.

Clause 46: A wireless communication device, including a processing system that includes processor circuitry and memory circuitry that stores code, the processing system configured to cause the wireless communication device to perform a method of any of clauses 29-32.

Clause 47: A wireless communication device, including at least one means for performing a method of any of clauses 29-32.

Clause 48: A non-transitory computer-readable medium storing code for wireless communication, the code including instructions executable by one or more processors to perform a method of any of clauses 29-32.

As used herein, the term "determine" or "determining" encompasses a wide variety of actions and, therefore, "determining" can include calculating, computing, processing, deriving, estimating, investigating, looking up (such as via looking up in a table, a database, or another data structure), inferring, ascertaining, or measuring, among other possibilities. Also, "determining" can include receiving (such as receiving information), accessing (such as accessing data stored in memory) or transmitting (such as transmitting information), among other possibilities. Additionally, "determining" can include resolving, selecting, obtaining, choosing, establishing and other such similar actions.

As used herein, a phrase referring to "at least one of" or "one or more of" a list of items refers to any combination of those items, including single members. As an example, "at least one of a, b, or c" is intended to cover: a, b, c, a-b, a-c, b-c, and a-b-c. As used herein, "or" is intended to be interpreted in the inclusive sense, unless otherwise explicitly indicated. For example, "a or b" may include a only, b only, or a combination of a and b. Furthermore, as used herein, a phrase referring to "a" or "an" element refers to one or more of such elements acting individually or collectively to perform the recited function(s). Additionally, a "set" refers to one or more items, and a "subset" refers to less than a whole set, but non-empty.

As used herein, "based on" is intended to be interpreted in the inclusive sense, unless otherwise explicitly indicated. For example, "based on" may be used interchangeably with "based at least in part on," "associated with," "in association with," or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions, or information.

The various illustrative components, logic, logical blocks, modules, circuits, operations, and algorithm processes described in connection with the examples disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the examples described in this disclosure may be readily apparent to persons having ordinary skill in the art, and the generic principles defined herein may be applied to other examples without departing from the spirit or scope of this disclosure. Thus, the claims are not intended to be limited to the examples shown herein, but are to be accorded the widest scope consistent with this disclosure, the principles and the novel features disclosed herein.

Additionally, various features that are described in this specification in the context of separate examples also can be implemented in combination in a single implementation. Conversely, various features that are described in the context of a single implementation also can be implemented in multiple examples separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

What is claimed is:

1. A wireless communication device, comprising:
    a processing system that includes processor circuitry and memory circuitry that stores code, the processing system configured to cause the wireless communication device to:
        receive an indication to transmit a single-user wireless packet associated with an extended long range communication mode, wherein the single-user wireless packet includes a preamble portion and a data portion, and wherein at least the data portion is associated with a duplication scheme pertaining to the extended long range communication mode; and
        transmit, in accordance with the indication, the single-user wireless packet using a first quantity of duplications of at least the data portion in accordance with the duplication scheme, wherein the first quantity of duplications is associated with the extended long range communication mode.

2. The wireless communication device of claim 1, wherein the processing system is further configured to cause the wireless communication device to:
    produce the first quantity of duplications of at least the data portion according to a blockwise repetition procedure; and
    apply a binary convolutional coding (BCC) interleaver, a low-density parity check (LDPC) tone mapper, or both to the data portion.

3. The wireless communication device of claim 2, wherein the processing system is further configured to cause the wireless communication device to:
    apply a scrambling sequence to the first quantity of duplications of at least the data portion prior to applying the BCC interleaver, the LDPC tone mapper, or both to the data portion.

4. The wireless communication device of claim 1, wherein the processing system is further configured to cause the wireless communication device to:
    encode the data portion according to a low-density parity check (LDPC) coding scheme, wherein the LDPC coding scheme is associated with an outer coding of the data portion;

encode LDPC coded bits of the data portion according to a repetition coding scheme, wherein the repetition coding scheme is associated with an inner coding of the data portion; and produce the first quantity of duplications of at least the data portion in accordance with concatenating the LDPC coding scheme with the repetition coding scheme and repeating LDPC encoded bits by the first quantity.

5. The wireless communication device of claim 1, wherein the processing system is further configured to cause the wireless communication device to:

duplicate a plurality of symbols of the data portion in a time domain to produce the first quantity of duplications, the single-user wireless packet including a quantity of guard intervals in the time domain corresponding to the first quantity of duplications.

6. The wireless communication device of claim 1, wherein the processing system is further configured to cause the wireless communication device to:

populate a subset of tones in a frequency domain in accordance with the first quantity of duplications; and produce the first quantity of duplications in accordance with transforming a frequency domain signal associated with the subset of tones to a time domain signal associated with a plurality of symbols, wherein the plurality of symbols are associated with the first quantity of duplications, and wherein the single-user wireless packet includes a guard interval prior to the plurality of symbols.

7. The wireless communication device of claim 6, wherein the guard interval comprises a short guard interval of less than one microsecond.

8. The wireless communication device of claim 6, wherein a quantity of the subset of tones is based at least in part on a resource unit size.

9. The wireless communication device of claim 6, wherein, to populate the subset of tones, the processing system is configured to cause the wireless communication device to:

populate every fourth tone in a frequency domain resource allocation associated with a 4× symbol.

10. The wireless communication device of claim 1, wherein the processing system is further configured to cause the wireless communication device to:

modulate at least the data portion of the single-user wireless packet according to a first modulation and coding scheme (MCS) and a first resource allocation, the first resource allocation being associated with the first quantity of duplications.

11. The wireless communication device of claim 10, wherein the first MCS is MCS14 or MCS15 and the first resource allocation includes 26 tones, the first quantity of duplications being extremely high throughout (EHT) duplications.

12. The wireless communication device of claim 10, wherein the first MCS is MCS14 and the first resource allocation is a quantity of duplications of a resource unit including 52 tones, the quantity of duplications of the resource unit including 52 tones corresponding to the first quantity of duplications.

13. The wireless communication device of claim 10, wherein the first MCS is MCS15 and the first resource allocation is a quantity of duplications of a first resource unit including 106 tones, the quantity of duplications of the first resource unit including 106 tones corresponding to half of the first quantity of duplications.

14. The wireless communication device of claim 1, wherein the duplication scheme comprises a coded-bit duplication scheme, a time domain duplication scheme, a frequency domain duplication scheme, or any combination thereof.

15. The wireless communication device of claim 14, wherein the first quantity of duplications includes a first subset of duplications in accordance with the frequency domain duplication scheme and a second subset of duplications in accordance with the time domain duplication scheme.

16. The wireless communication device of claim 14, wherein the first quantity of duplications includes a first subset of duplications in accordance with the coded-bit duplication scheme and a second subset of duplications in accordance with the time domain duplication scheme.

17. The wireless communication device of claim 14, wherein the first quantity of duplications includes a first subset of duplications in accordance with the coded-bit duplication scheme and a second subset of duplications in accordance with the frequency domain duplication scheme.

18. The wireless communication device of claim 1, wherein, to transmit the single-user wireless packet, the processing system is configured to cause the wireless communication device to:

transmit the single-user wireless packet using the first quantity of duplications of at least the data portion and a signal (SIG) field of the single-user wireless packet in accordance with the duplication scheme, wherein the SIG field of the single-user wireless packet is associated with the extended long range communication mode.

19. The wireless communication device of claim 1, wherein the processing system is further configured to cause the wireless communication device to:

transmit a request to transmit the single-user wireless packet, wherein receiving the indication to transmit the single-user wireless packet is based at least in part on the request.

20. The wireless communication device of claim 1, wherein the single-user wireless packet is associated with a single-user physical layer protocol data unit (PPDU) format.

21. A wireless communication device, comprising:

a processing system that includes processor circuitry and memory circuitry that stores code, the processing system configured to cause the wireless communication device to:

receive an indication of a resource allocation via which to transmit a single-user wireless packet associated with an extended long range communication mode, wherein the resource allocation is associated with a distributed resource unit including 52 tones and a first frequency range; and transmit the single-user wireless packet in accordance with the resource allocation, wherein the resource allocation is associated with the extended long range communication mode.

22. The wireless communication device of claim 21, wherein the processing system is further configured to cause the wireless communication device to:

apply a power backoff in accordance with the resource allocation, wherein the resource allocation being associated with the distributed resource unit including 52 tones and the extended long range communication mode triggers an application of the power backoff; and transmit the single-user wireless packet in accordance with the power backoff.

23. The wireless communication device of claim 21, wherein:
the first frequency range is 20 megahertz (MHz).

24. The wireless communication device of claim 21, wherein the single-user wireless packet is associated with power boosting, range extension, or both relative to other wireless packet transmissions by the wireless communication device.

25. A method for wireless communications at a wireless communication device, comprising:
receiving an indication to transmit a single-user wireless packet associated with an extended long range communication mode, wherein the single-user wireless packet includes a preamble portion and a data portion, and wherein at least the data portion is associated with a duplication scheme pertaining to the extended long range communication mode; and
transmitting, in accordance with the indication, the single-user wireless packet using a first quantity of duplications of at least the data portion in accordance with the duplication scheme, wherein the first quantity of duplications is associated with the extended long range communication mode.

26. The method of claim 25, further comprising:
producing the first quantity of duplications of at least the data portion according to a blockwise repetition procedure; and
applying a binary convolutional coding (BCC) interleaver, a low-density parity check (LDPC) tone mapper, or both to the data portion.

27. The method of claim 26, further comprising:
applying a scrambling sequence to the first quantity of duplications of at least the data portion prior to applying the BCC interleaver, the LDPC tone mapper, or both to the data portion.

28. A method for wireless communications at a wireless communication device, comprising:
transmitting an indication to transmit a single-user wireless packet associated with an extended long range communication mode, wherein the single-user wireless packet includes a preamble portion and a data portion, and wherein at least the data portion is associated with a duplication scheme pertaining to the extended long range communication mode; and
receiving, in accordance with the indication, the single-user wireless packet using a first quantity of duplications of at least the data portion in accordance with the duplication scheme, wherein the first quantity of duplications is associated with the extended long range communication mode.

29. The method of claim 28, wherein receiving the single-user wireless packet comprises:
receiving the single-user wireless packet using the first quantity of duplications of at least the data portion and a signal (SIG) field of the single-user wireless packet in accordance with the duplication scheme, wherein the SIG field of the single-user wireless packet is associated with the extended long range communication mode.

30. The method of claim 28, further comprising:
receiving a request to transmit the single-user wireless packet, wherein receiving the indication to transmit the single-user wireless packet is based at least in part on the request.

* * * * *